United States Patent
Lee et al.

(10) Patent No.: US 12,225,531 B2
(45) Date of Patent: Feb. 11, 2025

(54) METHOD AND DEVICE FOR TRANSMITTING INFORMATION RELATED TO POSITIONS OF MULTIPLE SIDELINK RESOURCES IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 17/638,465

(22) PCT Filed: Aug. 27, 2020

(86) PCT No.: PCT/KR2020/011497
§ 371 (c)(1),
(2) Date: Feb. 25, 2022

(87) PCT Pub. No.: WO2021/040436
PCT Pub. Date: Mar. 4, 2021

(65) Prior Publication Data
US 2022/0417973 A1    Dec. 29, 2022

Related U.S. Application Data

(60) Provisional application No. 62/892,565, filed on Aug. 28, 2019.

(51) Int. Cl.
*H04W 72/20*    (2023.01)
(52) U.S. Cl.
CPC .................. *H04W 72/20* (2023.01)

(58) Field of Classification Search
CPC ....... H04W 72/20; H04W 72/25; H04W 4/40; H04W 92/18; H04L 5/0044; H04L 5/0053; H04L 5/0094
See application file for complete search history.

(56) References Cited

U.S. PATENT DOCUMENTS

2020/0374860 A1* 11/2020 Panteleev ............. H04L 5/0044

FOREIGN PATENT DOCUMENTS

KR     20160140756     12/2016

OTHER PUBLICATIONS

ZTE, "NR sidelink physical layer structure," 3GPP TSG-RAN WG1 #98, R1-1908894, Aug. 2019, 21 pages.
(Continued)

*Primary Examiner* — Eric Myers
(74) *Attorney, Agent, or Firm* — LEE, HONG, DEGERMAN, KANG & WAIMEY

(57) ABSTRACT

Proposed is a method for a first device to perform wireless communication. The method may include a step for transmitting sidelink control information (SCI) to a second device through a first physical sidelink control channel (PSCCH) or a first physical sidelink shared channel (PSSCH) related to the first PSCCH, and transmitting data to the second device through the first PSSCH related to the first PSCCH. For example, the SCI may include combination information related to the positions of a plurality of sidelink (SL) resources, and information related to the relative position of a resource on which the first PSSCH is transmitted among the plurality of SL resources.

20 Claims, 24 Drawing Sheets

(56) References Cited

OTHER PUBLICATIONS

MediaTek Inc., "On sidelink mode-2 resource allocation," 3GPP TSG-RAN WG1 #98, R1-1908398, Aug. 2019, 13 pages.
CATT, "Discussion on resource allocation mechanism for sidelink Mode 2 in NR V2X," 3GPP TSG-RAN WG1 #98, R1-1908581, Aug. 2019, 15 pages.
Intel Corporation, "Sidelink Resource Allocation Mode-2 Design for NR V2X Communication," 3GPP TSG-RAN WG1 #97, R1-1906796, May 2019, 20 pages.
PCT International Application No. PCT/KR2020/011497, International Search Report dated Nov. 17, 2020, 4 pages.

\* cited by examiner

FIG. 4
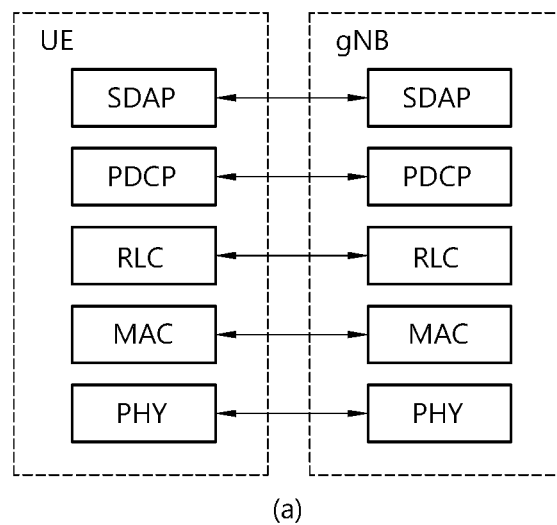
(a)
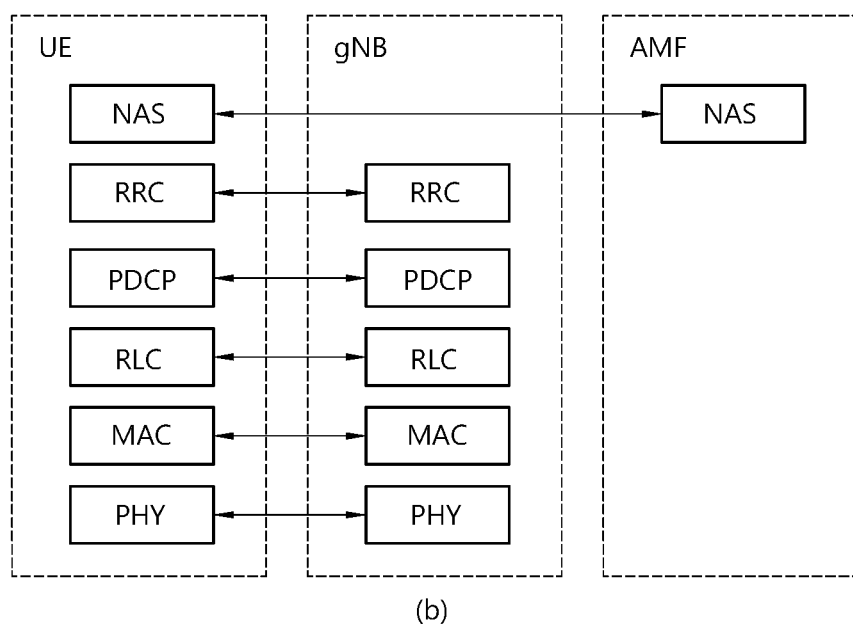
(b)

FIG. 8
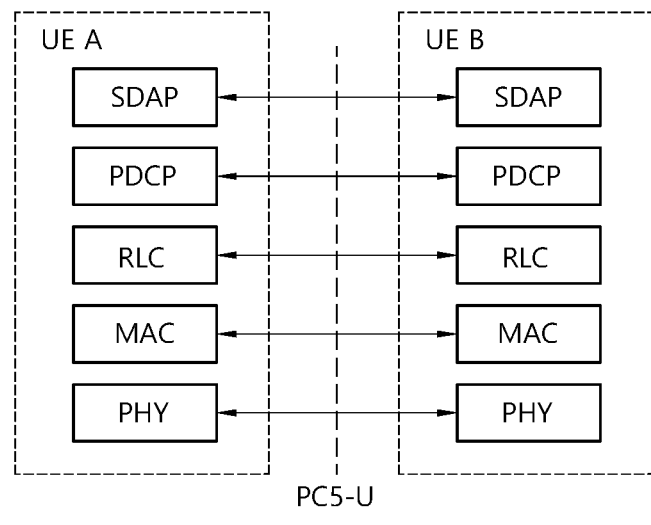
(a)
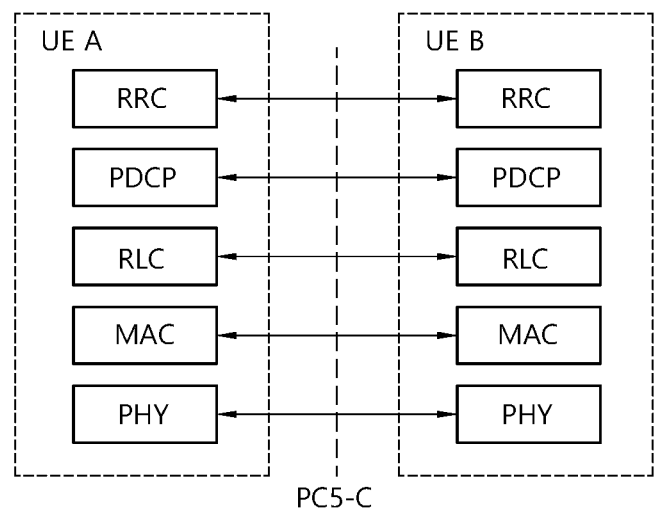
(b)

METHOD AND DEVICE FOR TRANSMITTING INFORMATION RELATED TO POSITIONS OF MULTIPLE SIDELINK RESOURCES IN NR V2X

CROSS-REFERENCE TO RELATED APPLICATIONS

This application is the National Stage filing under 35 U.S.C. 371 of International Application No. PCT/KR2020/011497, filed on Aug. 27, 2020, and claims the benefit of U.S. Provisional Application No. 62/892,565, filed Aug. 28, 2019, the contents of which are all incorporated by reference herein in their entirety.

BACKGROUND OF THE DISCLOSURE

Field of the disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the NR V2X communication or the NR sidelink communication, the transmitting user equipment (UE) may reserve/select one or more transmission resources for sidelink transmission (e.g., initial transmission and/or retransmission), and the transmitting UE may inform the receiving UE of information on a location of the one or more transmission resources. In this case, there may be a need for a method for a transmitting UE to efficiently transmit/signal information on resources related to a plurality of sidelink transmissions on one SCI.

Technical Solutions

According to an embodiment of the present disclosure, there is provided a method of performing wireless communication by a first device. The method may include transmitting a sidelink control information (SCI) to a second device through a first physical sidelink control channel (PSCCH) or a first physical sidelink shared channel (PSSCH) related to the first PSCCH and transmitting data to the second device through the first PSSCH related to the first PSCCH. For example, the SCI may include combination information related to a location of a plurality of sidelink (SL) resources and information related to a relative position of resources in which the first PSSCH is transmitted among the plurality of SL resources.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
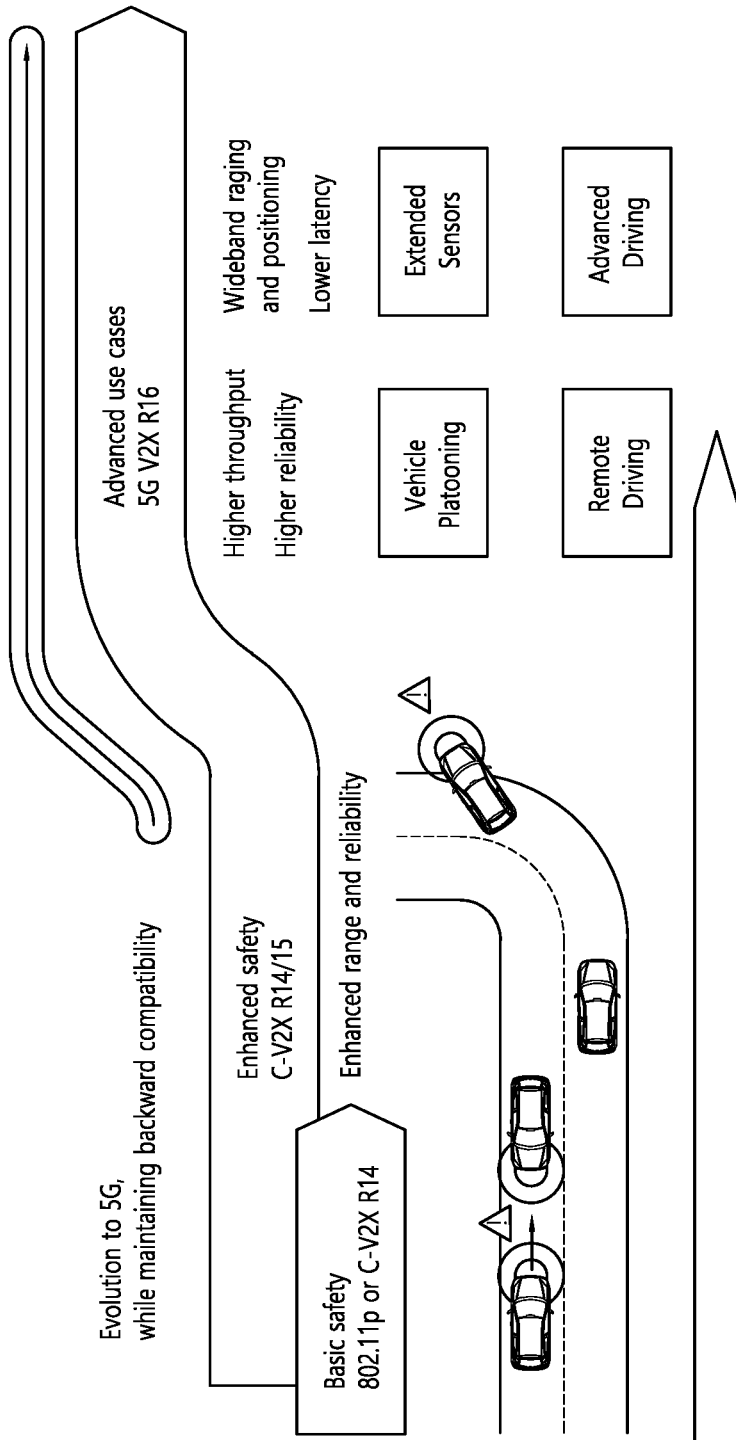
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
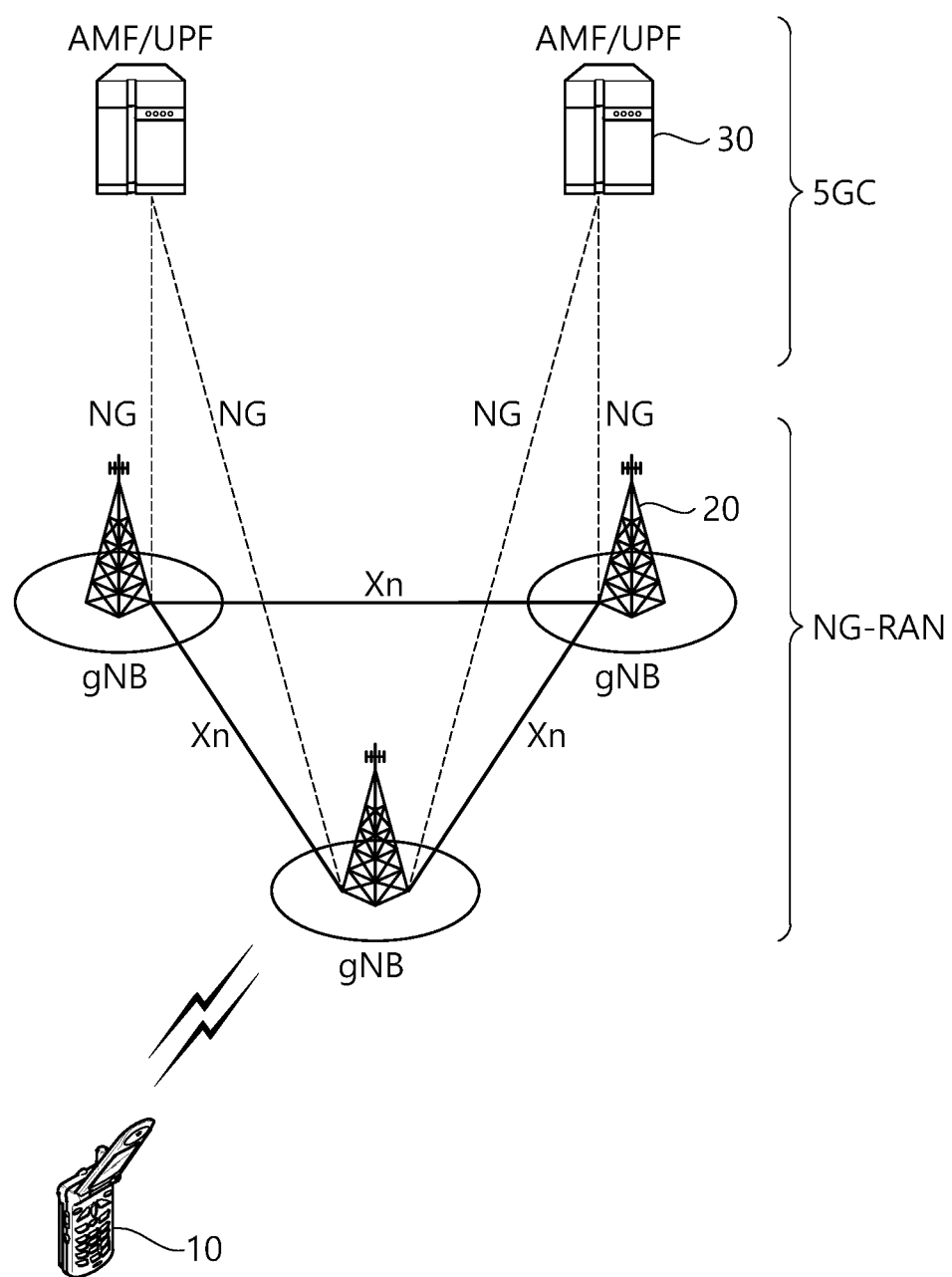
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
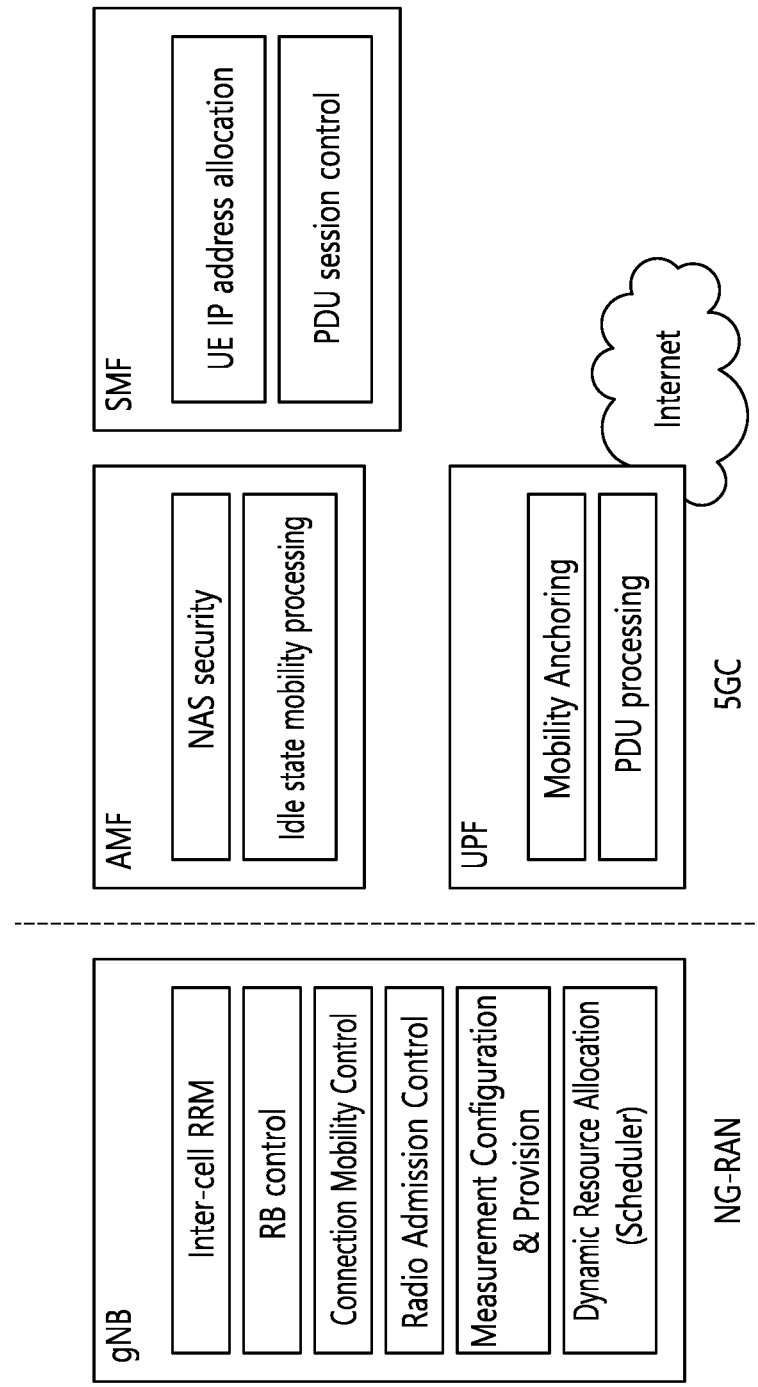
FIG. 3 shows a functional division between an NG-RAN and a SGC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
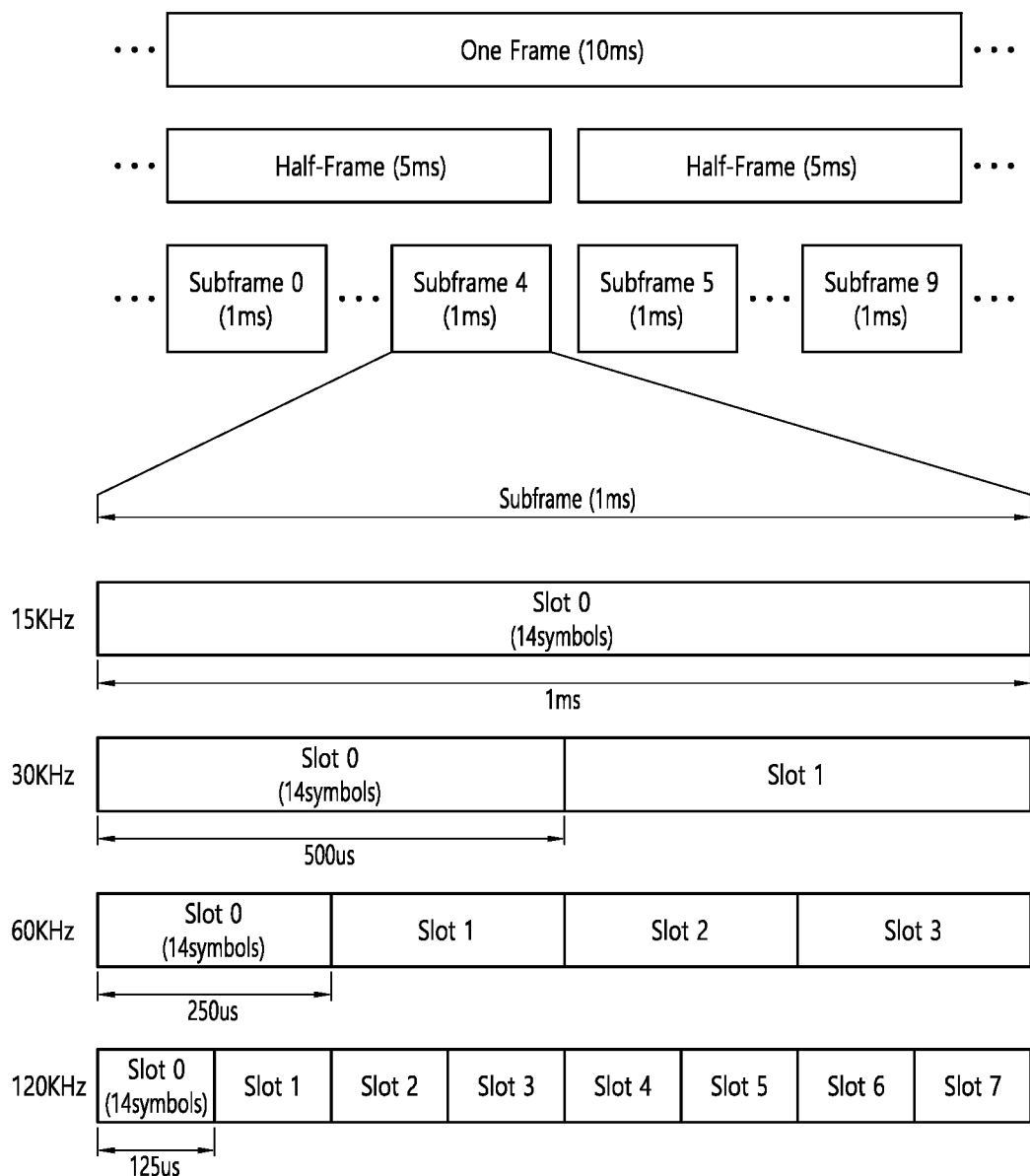
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
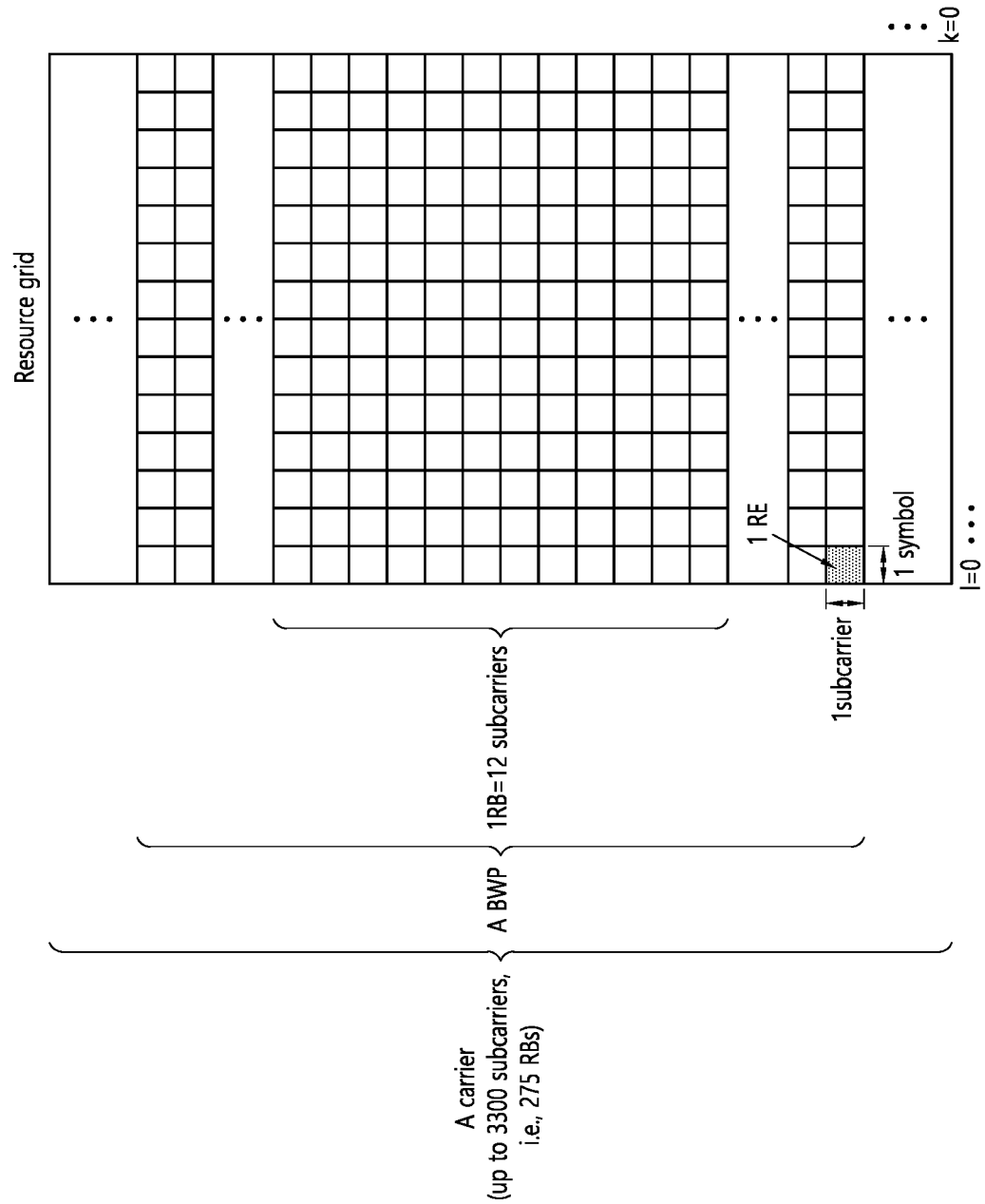
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
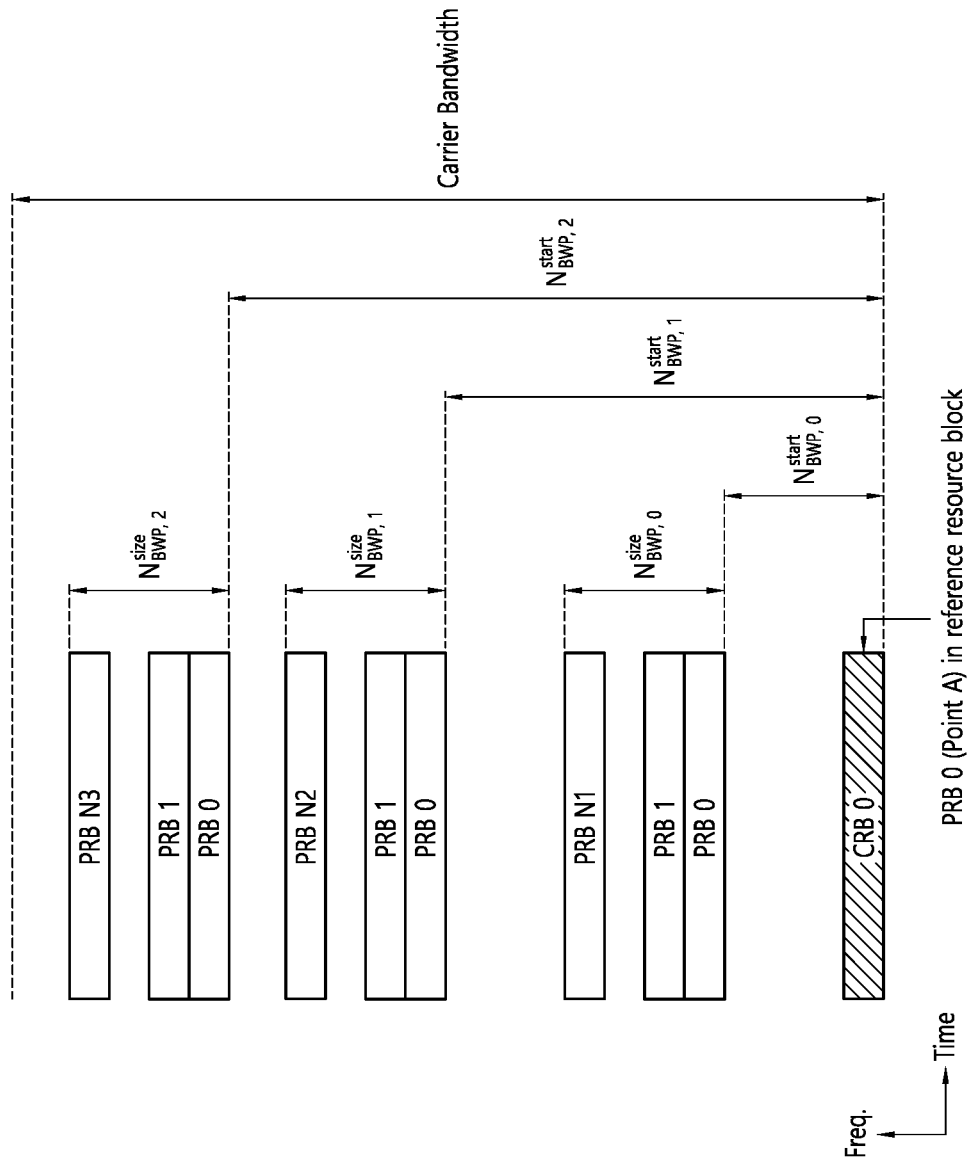
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
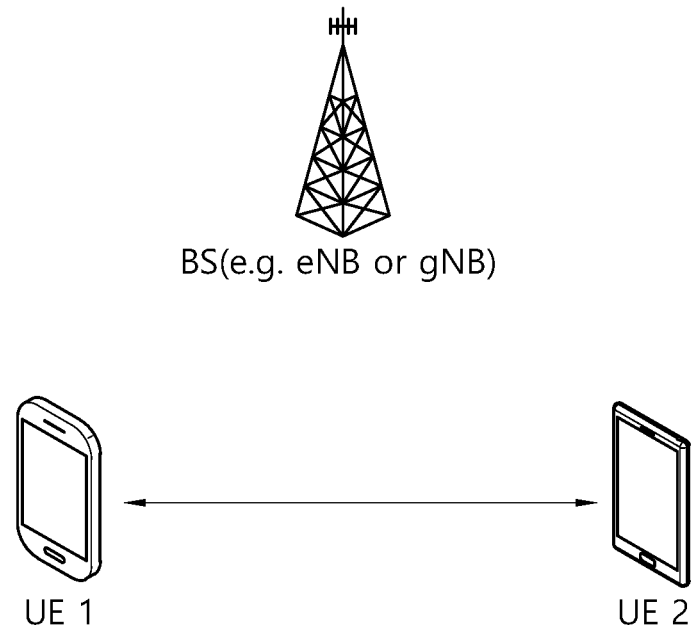
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
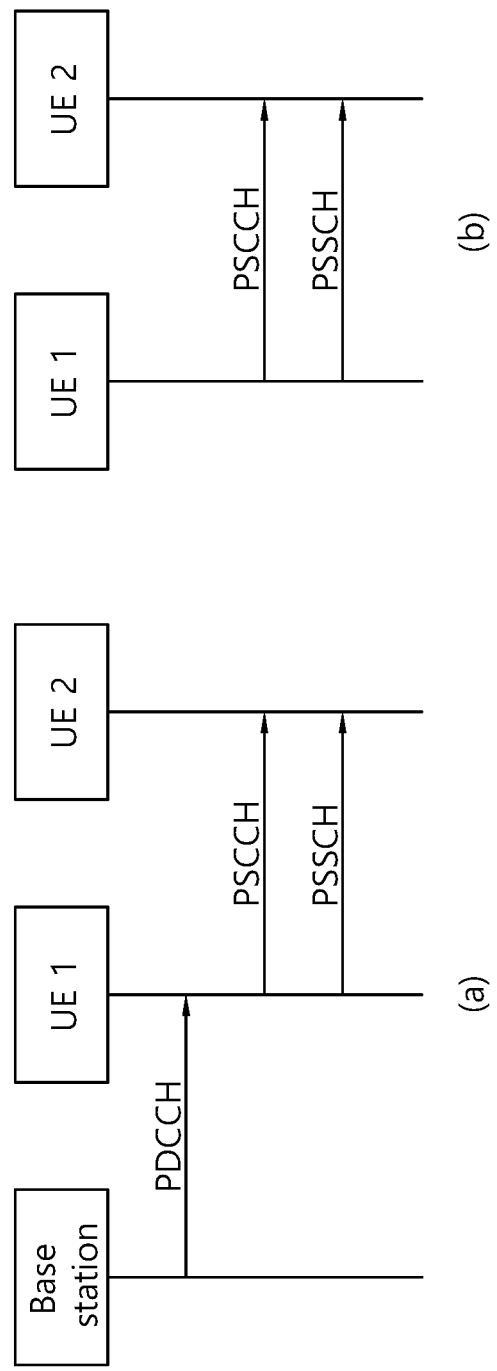
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
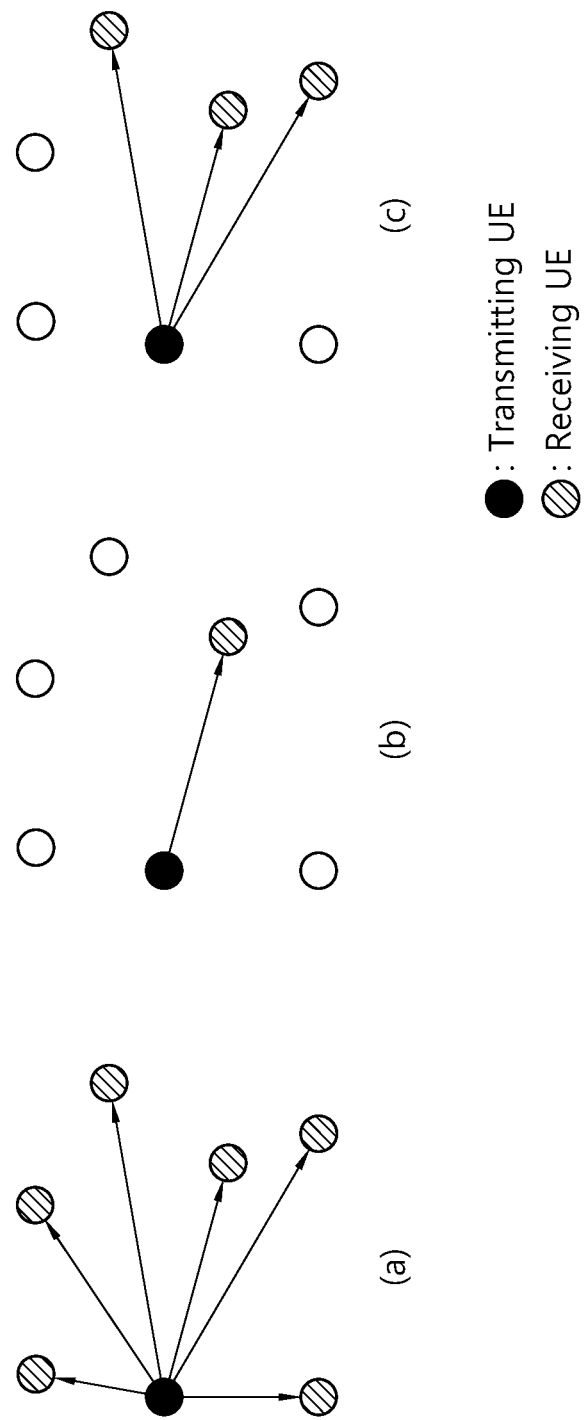
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, for example, a transmitting UE (TX UE) may be a UE transmitting data to a (target) receiving UE (RX UE). For example, a TX UE may be a UE performing PSCCH and/or PSSCH transmission. And/or, for example, a TX UE may be a UE that transmits an SL CSI-RS and/or SL CSI report request indicator to a (target) RX UE. And/or, for example, a TX UE may be a UE that transmits a reference signal (e.g., DM-RS, CSI-RS) on a channel and/or the (control) channel (e.g., PSCCH, PSSCH) to be used for the SL RLM and/or SL RLF operation of a (target) RX UE.

Meanwhile, in various embodiments of the present disclosure, for example, a receiving UE (RX UE) may be a UE transmitting SL HARQ feedback to a transmitting UE (TX UE) according to whether decoding of data received from the TX UE succeeds and/or whether the detection/decoding success of a PSCCH (related to a PSSCH scheduling) transmitted by the TX UE. And/or, for example, a RX UE may be a UE that performs SL CSI transmission to a TX UE based on the SL CSI-RS and/or the SL CSI report request indicator received from the TX UE. And/or, for example, a RX UE is a UE that transmits to a TX UE a SL (L1) RSRP measurement value measured based on a (pre-defined) reference signal and/or the SL (L1) RSRP report request indicator received from the TX UE. And/or, for example, a RX UE may be a UE that transmits its own data to a TX UE. And/or, for example, a RX UE may be a UE that performs SL RLM and/or SL RLF operations based on a reference signal on a (control) channel and/or a (pre-configured) (control) channel received from a TX UE.

Meanwhile, in various embodiments of the present disclosure, for example, when the RX UE transmits SL HARQ feedback information for the PSSCH and/or PSCCH received from the TX UE, the following scheme or some of the following schemes may be considered. Herein, for example, the following scheme or some of the following schemes may be limitedly applied only when the RX UE successfully decodes/detects the PSCCH scheduling the PSSCH.

(1) Groupcast HARQ feedback option 1: NACK information may be transmitted to the TX UE only when the RX UE fails to decode/receive the PSSCH received from the TX UE.

(2) Groupcast HARQ feedback option 2: When the RX UE succeeds in decoding/receiving the PSSCH received from the TX UE, ACK information may be transmitted to the TX UE, and when PSSCH decoding/reception fails, NACK information may be transmitted to the TX UE.

Meanwhile, in various embodiments of the present disclosure, for example, the transmitting UE may transmit the entirety or part of information described below to the receiving UE through the SCI. Herein, for example, the transmitting UE may transmit the entirety or part of the information described below to the receiving UE through the first SCI and/or the second SCI.

- PSSCH and/or PSCCH related resource allocation information, e.g., the number/positions of time/frequency resources, resource reservation information (e.g., period), and/or
- SL CSI report request indicator or SL (L1) RSRP (and/or SL (L1) RSRQ and/or SL (L1) RSSI) report request indicator, and/or
- SL CSI transmission indicator (or SL (L1) RSRP (and/or SL (L1) RSRQ and/or SL (L1) RSSI) information transmission indicator)) (on a PSSCH), and/or
- MCS information, and/or
- Transmit power information, and/or
- L1 destination ID information and/or L1 source ID information, and/or
- SL HARQ process ID information, and/or
- New data indicator (NDI) information, and/or
- Redundancy version (RV) information, and/or
- (Transmission traffic/packet related) QoS information, e.g., priority information, and/or
- SL CSI-RS transmission indicator or information on the number of (to-be-transmitted) SL CSI-RS antenna ports, and/or
- Location information of a transmitting UE or location (or distance region) information of a target receiving UE (for which SL HARQ feedback is requested), and/or
- Reference signal (e.g., DMRS, etc.) related to channel estimation and/or decoding of data to be transmitted through a PSSCH, e.g., information related to a pattern of a (time-frequency) mapping resource of DMRS, rank information, antenna port index information, information on the number of antenna ports Meanwhile, in various embodiments of the present disclosure, for example, since the TX UE may transmit the SCI, the first SCI and/or the second SCI to the RX UE through the PSCCH, the PSCCH may be replaced/substituted with at least one of SCI, first SCI, and/or second SCI. And/or, for example, the SCI may be replaced/replaced by the PSCCH, the first SCI and/or the second SCI. And/or, for example, since the TX UE may transmit the second SCI to the RX UE through the PSSCH, the PSSCH may be replaced/substituted with the second SCI.

Meanwhile, in various embodiments of the present disclosure, for example, when SCI configuration fields are divided into two groups in consideration of the (relatively) high SCI payload size, the first SCI including the first SCI configuration field group may be referred to as 1st SCI, and the second SCI including the second SCI configuration field group may be referred to as 2nd SCI. In addition, for example, the 1st SCI may be transmitted to the receiving UE through the PSCCH. In addition, for example, the 2nd SCI may be transmitted to the receiving UE through (independent) PSCCH, or may be piggybacked with data through PSSCH and transmitted.

Meanwhile, in various embodiments of the present disclosure, "configuration" or "define" may mean (resource pool specific) (pre-) configuration from a base station or network (via pre-defined signaling (e.g., SIB, MAC, RRC, etc.)).

Meanwhile, in this specification, for example, since RLF may be determined based on an OUT-OF-SYNCH (OOS)

indicator or an IN-SYNCH (IS) indicator, RLF may be replaced/replaced by an OUT-OF-SYNCH (OOS) or an IN-SYNCH (IS).

Meanwhile, in various embodiments of the present disclosure, a resource block (RB) may be replaced/substituted with a sub-carrier. In addition, for example, in the present disclosure, a packet or traffic may be substituted/replaced with a transport block (TB) or MAC PDU according to a transmitted layer.

Meanwhile, in various embodiments of the present disclosure, for example, a CBG may be replaced/substituted with a TB.

Meanwhile, in various embodiments of the present disclosure, for example, a source ID may be replaced/substituted with a destination ID.

Meanwhile, in various embodiments of the present disclosure, for example, a L1 ID may be replaced/substituted by a L2 ID. For example, a L1 ID may be a L1 source ID or a L1 destination ID. For example, a L2 ID may be a L2 source ID or a L2 destination ID.

Meanwhile, in various embodiments of the present disclosure, an operation of a transmitting UE to reserve/select/determine retransmission resources may refer to an operation in which the transmitting UE reserves/selects/determines potential retransmission resources whose actual use will be determined based on a SL HARQ feedback information received from a receiving UE.

Meanwhile, in various embodiments of the present disclosure, SL MODE 1 may mean a resource allocation method or a communication method in which a base station directly schedules sidelink transmission (SL TX) resources of a UE through predefined signaling (e.g., DCI). For example, SL MODE 2 may refer to a resource allocation method or a communication method in which a UE independently selects SL TX resources in a pre-configured resource pool or a resource pool configured from a base station or a network. For example, a UE performing SL communication based on SL MODE 1 may be referred to as MODE 1 UE or MODE 1 TX UE, and a UE performing SL communication based on SL MODE 2 may be referred to as a MODE 2 UE or a MODE 2 TX UE.

Meanwhile, in various embodiments of the present disclosure, for convenience of explanation, for example, a (physical) channel used when the RX UE transmits at least one of the following information to the TX UE may be referred to as a PSFCH.

SL HARQ feedback, SL CSI, SL (L1) RSRP

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Meanwhile, in the NR V2X communication or the NR sidelink communication, the transmitting UE may reserve/select one or more transmission resources for sidelink transmission (e.g., initial transmission and/or retransmission), and the transmitting UE may inform the receiving UE of information on a location of the one or more transmission resources.

Hereinafter, according to an embodiment of the present disclosure, a method for a transmitting UE to transmit information on a location of resources related to a sidelink transmission and an apparatus supporting the same will be described.

According to an embodiment of the present disclosure, the transmitting UE may transmit/signal information on a location of resources related to N sidelink transmissions to the receiving UE on one SCI. For example, the transmitting UE may transmit/signal information on a location of resources related to N sidelink transmissions performed within the maximum (allowed) number of transmissions related to a specific TB configured differently or independently for each resource pool, a service type, a cast type, and/or QoS requirements of the service to the receiving UE on one SCI. For example, resources related to a sidelink transmission may be resources in a time domain and/or a frequency domain. For example, resources related to N sidelink transmissions may include one initial transmission resource and N−1 retransmission resources. For example, N may be a positive integer.

For example, when the transmitting UE transmits/signals information on the a location of resources related to N sidelink transmissions to the receiving UE on one SCI, The transmitting UE may be configured to follow the rules proposed in the present disclosure. Herein, for example, if the rules proposed the present disclosure below are applied, the size of a payload required for a transmitting UE to transmit/signal information on resources related to a plurality of sidelink transmissions on one SCI can be effectively reduced. Here, for example, for convenience of description, it is assumed that the maximum time gap that the transmitting UE can transmit/signal on SCI (e.g., one SCI) is M slots. For example, the maximum time gap may be pre-configured. For example, the maximum time gap may be a time gap between adjacent transmissions. Specifically, for example, when the time resource on which the C-th transmission of the transmitting UE is to be performed is slot #S, and the time resource on which the C+1-th transmission of the transmitting UE is performed is the slot #S+M+1, the maximum time gap may be M slots. For example, the maximum time gap may be a time gap between an initial transmission and a retransmission. For example, the maximum time gap may be a time gap between an initial transmission and a retransmission located farthest from the time axis. For example, the maximum time gap may be a time gap between an initial transmission and a last retransmission. Specifically, for example, when the time resource on which the initial transmission of the transmitting UE is to be performed is slot #I, and the time resource on which the last retransmission of the transmitting UE is performed is the slot #I+M+1, the maximum time gap may be M slots.

According to an embodiment of the present disclosure, the transmitting UE may transmit/signal information about time of slots selected for N transmission within M slots corresponding to the maximum time gap to the receiving UE. For example, the information about time may be a combinatorial index of an M value and an N value. For example, a field size of information about time may be obtained or determined by Equation 1.

$$\text{ceiling}(\log_2(mCn)) \qquad [\text{Equation 1}]$$

Here, mCn may mean a combination in which N is selected from among M candidates.

Here, for example, when a field of information about time is designated as a specific value, the receiving UE may identify/determine time location information or (relative) time gap information of a slot selected by the transmitting UE for N transmissions based on a predefined function or table.

For example, the information about time may include information on a timing of a slot at which the transmitting UE currently performs transmission and information on a timing(s) of a slot(s) related to the remaining N−1 transmissions except for the current transmission among the N transmissions of the transmitting UE. Alternatively, for example, the information about time may include information indicating a relative time gap between a time point of a slot at which the transmitting UE performs the current transmission and a time point(s) of a slot(s) related to the remaining N−1 transmissions excluding the current transmission among the N transmissions of the transmitting UE (or between slots related to sidelink transmission of the transmitting UE). Alternatively, for example, the information about time may include information indicating a relative time gap between a time point of a slot related to a pre-configured transmission (e.g. a slot related to an initial transmission) and a time point(s) of a slot(s) related to the remaining N−1 transmissions excluding the pre-configured transmission among the N transmissions of the transmitting UE.

Additionally, according to an embodiment of the present disclosure, in addition to the transmitting UE transmitting/signaling information about time to the receiving UE, the transmitting UE may transmit/signal information about a relative position of a slot currently performing transmission among the N transmission-related slots to the receiving UE. In the present disclosure, for convenience of explanation, an operation of the transmitting UE transmitting/signaling information about a relative position of a slot currently performing transmission among the N transmission-related slots selected among the M slots to the receiving UE may be referred to as an option 1 operation, and an operation in which the transmitting UE transmits/signals information about an absolute location of a slot currently performing transmission among M slots to the receiving UE may be referred to as an option 2 operation.

Compared to the case where the transmitting UE performs the option 2 operation, when the transmitting UE performs the option 1 operation, the number of bits on the SCI required to indicate the location of the slot resource currently performing transmission cab be reduced. Specifically, for example, assume that the value of M is 32 and the value of N is 4. In this case, when the transmitting UE performs the option 2 operation, 5 bits may be required in order for the transmitting UE to transmit/signal to the receiving UE the absolute location of the slot currently performing sidelink transmission. A value of 5 bits may be obtained or calculated based on Equation 2.

$$\text{ceiling}(\log_2 M) = \text{the number of bits} \quad \text{[Equation 2]}$$

Here, the 'ceiling (x)=y' function may be a function deriving a minimum integer value greater than or equal to x.

On the other hand, for example, when the transmitting UE performs the option 1 operation, in order for the transmitting UE to transmit/signal to the receiving UE the relative position of the slot currently performing sidelink transmission, 2 bits may be required. A value of 2 bits may be obtained or calculated based on Equation 3.

$$\text{ceiling}(\log_2 N) = \text{the number of bits} \quad \text{[Equation 3]}$$

Here, the 'ceiling (x)=y' function may be a function deriving a minimum integer value greater than or equal to x.

For example, it is sufficient for the receiving UE to know only the location of the slot related to the transmission indicated by the transmitting UE, since it is unnecessary to obtain information on the location related to the start/end of the time window consisting of M slots corresponding to the maximum time gap, option 1 operation of the transmitting UE can be more efficient than option 2. Herein, for example, when the rules proposed in the present disclosure are applied, even when information on the location of resources related to transmission of up to K sidelinks may be transmitted/signaled on SCI, or information on the location of resources related to transmission of up to K sidelinks is pre-configured to be transmitted/signaled on the SCI, the transmitting UE may transmit/signal to the receiving UE information on the location of resources related to less than (or less than or equal to) K number of sidelink transmissions. In such a case, for example, the overhead related to the information on the location of the resources transmitted on the SCI may change. For example, as the value of N is changed, the overhead related to the information on the location of the resources transmitted on the SCI may change. In this case, if the transmitting UE performs joint encoding in consideration of the change in overhead, the complexity of design/implementation can increase significantly. For example, since joint encoding considering changes in overhead affects time and frequency at the same time, the complexity of design/implementation can be very high. In order to solve the above-mentioned problem, for example, the transmitting UE may determine or configure a field reference size on a SCI based on a value (e.g., K) that maximizes the overhead related to the information on the location of the resources or a pre-configured value. In addition, the transmitting UE may perform zero padding on bit(s) not used to indicate a location of a resource related to sidelink transmission among bits corresponding to the field reference size. For example, the transmitting UE may configure bit(s) not used to indicate the location of a resource related to sidelink transmission among bits corresponding to the field reference size to zero.

According to an embodiment of the present disclosure, the transmitting UE may transmit/signal information for a time gap related to N−1 transmissions to the receiving UE on a SCI, additionally, the transmitting UE may transmit/signal to the receiving UE on the SCI information indicating whether information on each time gap is a past time point or a future time point based on a slot in which the transmitting UE currently performs transmission.

For example, the transmitting UE may transmit/signal information for a time gap related to the remaining N−1 transmissions to the receiving UE on a SCI except for the current transmission among the N transmissions of the transmitting UE based on a slot performing the current transmission, and additionally, the transmitting UE may transmit/signal to the receiving UE on the SCI information indicating whether information on each time gap is a past time point or a future time point based on a slot in which the transmitting UE currently performs transmission.

For example, the transmitting UE may transmit/signal information for a time gap related to N−1 sidelink transmissions to the receiving UE on a SCI based on a pre-configured slot related to sidelink transmission (e.g., a slot related to L-th sidelink transmission among slots related to N sidelink transmissions), and additionally, the transmitting UE may transmit/signal to the receiving UE on the SCI information indicating whether information on each time gap is a past time point or a future time point based on a slot in which the transmitting UE currently performs transmission.

According to an embodiment of the present disclosure, a time gap that the transmitting UE transmits/signals on a SCI may be applied/counted by using a slot related to a sidelink transmission adjacent to the current time as a reference timing point. For example, a maximum time gap that the transmitting UE transmits/signals on a SCI may be applied/ counted by using a slot related to the closest sidelink transmission before the current time as a reference timing point. For example, a maximum time gap that the transmitting UE transmits/signals on a SCI may be applied/counted by using a slot related to the closest sidelink transmission after the current time as a reference timing point.

According to an embodiment of the present disclosure, a time gap that the transmitting UE transmits/signals on a SCI may be applied/counted by using a pre-configured slot related to a sidelink transmission as a reference timing point. For example, a time gap that the transmitting UE transmits/signals on a SCI may be applied/counted by using a slot related to a sidelink transmission (e.g., a first transmission or an initial transmission) of a pre-configured sequence number as a reference timing point.

For example, compared with the case where a time gap is applied/counted using a pre-configured slot related to a sidelink transmission as a reference timing point, when a time gap is applied/counted using a slot related to a sidelink transmission adjacent to the current time point as a reference timing point, the transmitting UE may increase a degree of freedom related to resource selection on a time axis, and/or the transmitting UE may widen an area related to resource selection on a time axis. For example, when the transmitting UE performs sensing, and resources related to N transmissions determined to be idle state are not all located within the M slots corresponding to the maximum time gap, by applying/counting a time gap using a slot related to a sidelink transmission adjacent to the current time point as a reference timing point, the transmitting UE may increase a degree of freedom related to resource selection on a time axis, and/or the transmitting UE may widen an area related to resource selection on a time axis.

According to an embodiment of the present disclosure, the transmitting UE may transmit, to the receiving UE, information on the number of subchannels located on a slot related to the current transmission of the transmitting UE and/or information on the number of subchannels located on the remaining N−1 transmission slots excluding the current transmission among the N transmissions of the transmitting UE on a SCI related to the current sidelink transmission. In this case, for example, the number of subchannels located on a slot related to the current transmission of the transmitting UE and the number of subchannels located on a slot related to the remaining N−1 transmissions excluding the current transmission among the N transmissions of the transmitting UE may be the same. In this present disclosure, the information on the number of subchannels located on a slot related to the current transmission of the transmitting UE and/or the information on the number of subchannels located on the remaining N−1 transmission slots excluding the current transmission among the N transmissions of the transmitting UE may be referred to as INFO_LEN. Additionally, for example, the transmitting UE may transmit, to the receiving UE, information on a start position of a subchannel located on the remaining N−1 transmissions excluding the current transmission among the N transmissions of the transmitting UE on a SCI related to the current transmission. In this present disclosure, the information on a start position of a subchannel located on the remaining N−1 transmissions excluding the current transmission among the N transmissions of the transmitting UE may be referred to as INFO_ST.

Alternatively, for example, the transmitting UE may perform joint encoding for INFO_LEN and INFO_ST. For example, through signaling in the form of resource indication value (RIV) or combinatorial index, the transmitting UE may simultaneously inform the receiving UE of INFO_LEN and INFO_ST. Herein, for example, a PSCCH may be allocated over Q predefined RBs from a RB having the lowest index in subchannels used for a sidelink transmission. For example, a PSCCH may be allocated over Q predefined RBs from a RB having the highest index in subchannels used for a sidelink transmission. For example, a PSCCH may be allocated over Q predefined subcarriers from a subcarrier having the lowest index in subchannels used for a sidelink transmission. For example, a PSCCH may be allocated over Q predefined subcarriers from a subcarrier having the highest index in subchannels used for a sidelink transmission.

Figure 12:
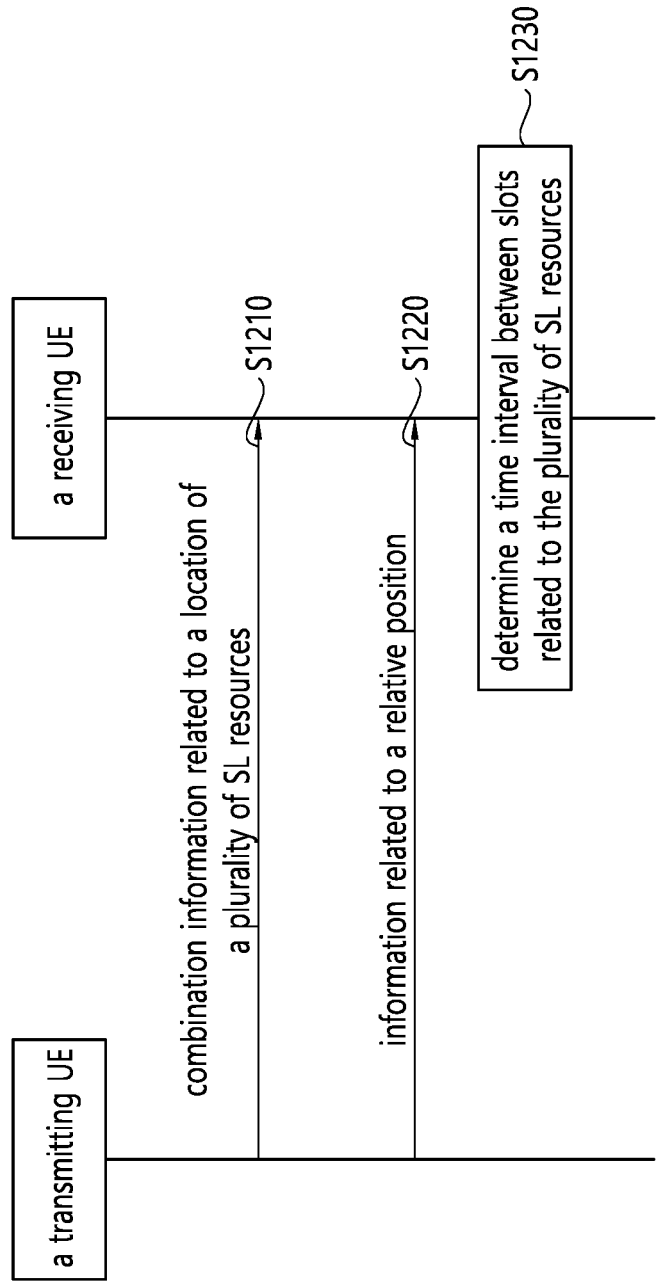
FIG. 12 shows a procedure in which a transmitting UE transmits combination information related to a location of a plurality of SL resources and information related to a relative position to a receiving UE according to an embodiment of the present disclosure.
Figure 13:
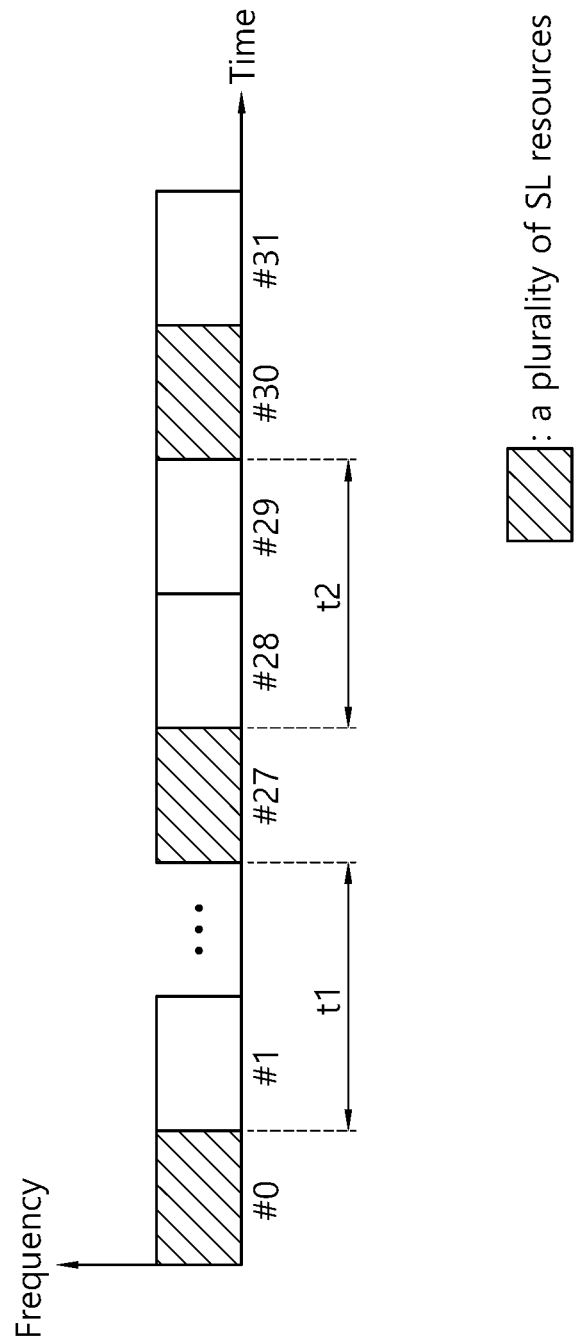
FIG. 13 shows slots related to a relative position related to a plurality of SL resources, according to an embodiment of the present disclosure.

FIG. 12 shows a procedure in which a transmitting UE transmits combination information related to a location of a plurality of SL resources and information related to a relative position to a receiving UE according to an embodiment of the present disclosure. The embodiment of FIG. 12 may be combined with various embodiments of the present disclosure. FIG. 13 shows slots related to a relative position related to a plurality of SL resources, according to an embodiment of the present disclosure. The embodiment of FIG. 13 may be combined with various embodiments of the present disclosure.

Referring to FIG. 12, in step S1210, the transmitting UE may transmit combination information related to a location of a plurality of SL resources to the receiving UE. For example, the transmitting UE may transmit combination information related to a location of a plurality of SL resources to the receiving UE on one SCI. For example, the combination information related to the location of the plurality of SL resources may include information on times of slots selected for N transmissions within M slots corresponding to the maximum time gap. For example, the combination information related to the location of the plurality of SL resources may include a combinatorial index of an M value and an N value.

Alternatively, For example, the combination information related to the location of the plurality of SL resources may include information on a time point of a slot at which the transmitting UE currently performs transmission and time location information for a time point(s) of a slot(s) related to the remaining N−1 transmissions except for the current transmission among the N transmissions of the transmitting UE. For example, the combination information related to the location of the plurality of SL resources may include information indicating a relative time gap between a time point of a slot at which the transmitting UE currently performs transmission and a time point(s) of a slot(s) related to the remaining N−1 transmissions except for the current transmission among the N transmissions of the transmitting UE (or between slots related to sidelink transmission of the transmitting UE). For example, the combination information related to the location of the plurality of SL resources may include information indicating a relative time gap between a time point of a slot related to a pre-configured transmission (e.g., a slot related to an initial transmission) and a time point(s) of a slot(s) related to the remaining N−1 transmissions except for the current transmission among the N transmissions of the transmitting UE.

In step S1220, the transmitting UE may transmit information related to a relative position to the receiving UE. For example, the transmitting UE may transmit information related to a relative position to the receiving UE on one SCI. For example, the information related to the relative position may include information related to a relative position of a plurality of SL resources. For example, the information related to the relative position of the plurality of SL resources may include information on a relative position of a slot currently performing transmission among slots related to N transmissions selected from among M slots.

For example, the transmitting UE may transmit combination information related to a location of a plurality of SL resources and information related to a relative position to the receiving UE on one SCI.

In step S1230, the receiving UE may determine a time interval between slots related to the plurality of SL resources based on the combination information related to the location of the plurality of SL resources and information related to the relative position. For example, the transmitting UE may determine a field size of the combination information related to the location of a plurality of SL resources based on Equation 1 above. For example, if the field size is specified as a specific value, the receiving UE may identify/determine time location information or (relative) time gap information of a slot selected by the transmitting UE for N transmissions based on a predefined function or table.

Referring to FIG. 13, slots (#0, #27, #30) selected by the transmitting UE for three transmissions within 32 slots corresponding to the maximum time gap are shown. For example, the transmitting UE may transmit a combination index of 32 values and 3 values to the receiving UE on the SCI. For example, the transmitting UE may transmit time location information on time points of slots (#27, #30) related to the remaining two transmissions except for the current transmission (#0) among the three transmissions of the transmitting UE to the receiving UE on the SCI. For example, the transmitting UE may transmit information indicating a relative time gap between the time point (#0) of the slot performing the current transmission and the time points of the slots related to the transmission of the remaining two (#27, #30) of the three transmissions of the transmitting UE except for the current transmission to the receiving UE on the SCI. For example, the transmitting UE may transmit at least one of a time gap (t1) between the slot (#0) performing the current transmission and the slot (#27) performing the second transmission, or a time gap (t2) between the slot (#27) performing the second transmission and the slot (#30) performing the third transmission to the receiving UE on the SCI. Additionally, for example, the transmitting UE may transmit information on a relative position of a slot currently performing transmission among the selected three transmission-related slots among 32 slots to the receiving UE on the SCI. For example, the transmitting UE may need 2 bits to transmit a relative position of a slot currently performing sidelink transmission to the receiving UE based on Equation 3 above.

According to an embodiment of the present disclosure, even when the transmitting UE transmits combination information related to the location of resources related to up to K sidelink transmissions on a SCI or the transmitting UE is pre-configured to transmit combination information related to the location of resources related to up to K sidelink transmissions on a SCI, the transmitting UE may actually transmit to the receiving UE the combination information related to the location of resources related to the number of sidelink transmissions of less than (or less than or equal to) K. In this case, for example, the transmitting UE may determine a field reference size on the SCI based on a value (e.g., K) that maximizes an overhead related to the combination information or a pre-configured value. In addition, the transmitting UE may perform zero padding on bit(s) not used to indicate the location of resources related to sidelink transmissions among bits corresponding to the field reference size. For example, the transmitting UE may configure 2 bits that are not used to indicate the location of resources related to sidelink transmissions among 5 bits corresponding to the field reference size to zero.

According to an embodiment of the present disclosure, the transmitting UE may transmit information for a time gap related to N−1 sidelink transmissions to the receiving UE on a SCI, and additionally, the transmitting UE may transmit to the receiving UE on the SCI information indicating whether information on each time gap is a past time point or a future time point based on a slot in which the transmitting UE currently performs transmission.

According to an embodiment of the present disclosure, the time gap transmitted by the transmitting UE on the SCI may be applied using a slot related to a sidelink transmission adjacent to the current time as a reference timing point.

According to an embodiment of the present disclosure, the time gap transmitted by the transmitting UE on the SCI may be applied using a pre-configured slot related to a sidelink transmission as a reference timing point. For example, the time gap transmitted by the transmitting UE on the SCI may be applied with a slot related to a pre-configured sidelink transmission (e.g., a first transmission or an initial transmission) as a reference timing point.

Figure 14:
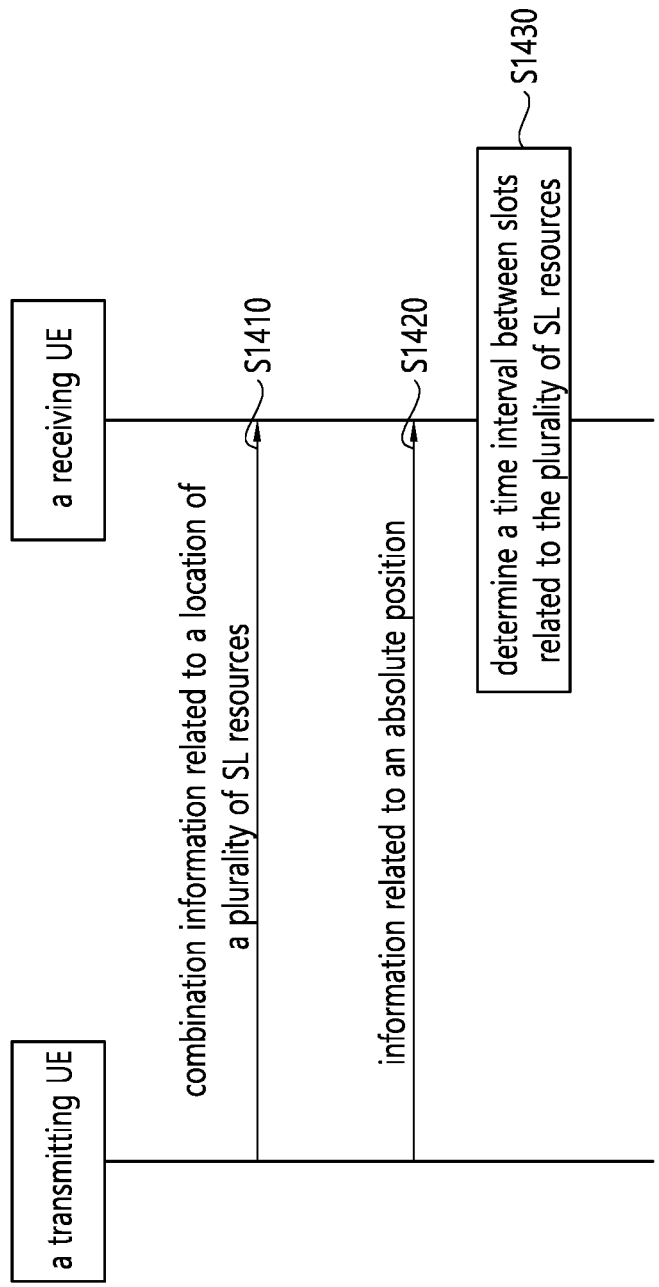
FIG. 14 shows a procedure in which a transmitting UE transmits combination information related to a location of a plurality of SL resources and information related to an absolute position to a receiving UE according to an embodiment of the present disclosure.
Figure 15:
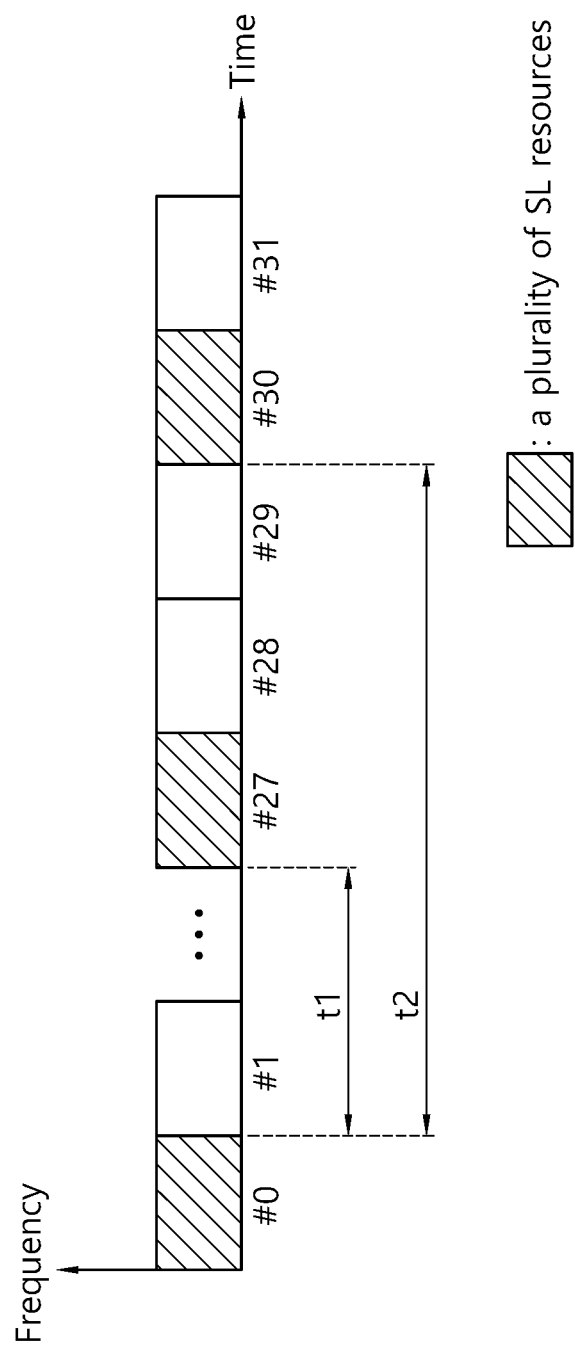
FIG. 15 shows slots related to an absolute position related to a plurality of SL resources according to an embodiment of the present disclosure.

FIG. 14 shows a procedure in which a transmitting UE transmits combination information related to a location of a plurality of SL resources and information related to an absolute position to a receiving UE according to an embodiment of the present disclosure. The embodiment of FIG. 14 may be combined with various embodiments of the present disclosure. FIG. 15 shows slots related to an absolute position related to a plurality of SL resources according to an embodiment of the present disclosure. The embodiment of FIG. 15 may be combined with various embodiments of the present disclosure.

Referring to FIG. 14, in step S1410, the transmitting UE may transmit combination information related to a location of a plurality of SL resources to the receiving UE. For example, the transmitting UE may transmit combination information related to a location of a plurality of SL resources to the receiving UE on one SCI. For example, the combination information related to the location of the plurality of SL resources may include information on times of slots selected for N transmissions within M slots corresponding to the maximum time gap. For example, the combination information related to the location of the plurality of SL resources may include a combinatorial index of an M value and an N value.

Alternatively, For example, the combination information related to the location of the plurality of SL resources may include information on a time point of a slot at which the transmitting UE currently performs transmission and time location information for a time point(s) of a slot(s) related to the remaining N−1 transmissions except for the current transmission among the N transmissions of the transmitting UE.

In step S1420, the transmitting UE may transmit information related to an absolute position to the receiving UE. For example, the information related to the absolute position may include information related to an absolute position for a plurality of SL resources. For example, the information related to the absolute position for the plurality of SL resources may include information on an absolute position of a slot currently performing transmission among M slots.

For example, the transmitting UE may transmit combination information related to a location of a plurality of SL resources and information related to an absolute position to the receiving UE in one SCI.

In step S1430, the receiving UE may determine a time interval between slots related to a plurality of SL resources based on the combination information related to the location of the plurality of SL resources and the information related to the absolute position. For example, the transmitting UE may determine a field size of the information related to the location of the plurality of SL resources based on Equation 1 above. For example, if the field size is specified as a specific value, the receiving UE may identify/determine time location information or (relative) time gap information of a slot selected by the transmitting UE for N transmissions based on a predefined function or table.

Referring to FIG. 15, slots (#0, #27, #30) selected by a transmitting UE for three transmissions within 32 slots corresponding to the maximum time gap are shown. For example, the transmitting UE may transmit a combinatorial index of 32 values and 3 values to the receiving UE on the SCI. For example, the transmitting UE may transmit time location information on time points of slots (#27, #30) related to the remaining two transmissions except for the current transmission (#0) among the three transmissions of the transmitting UE to the receiving UE on the SCI. For example, the transmitting UE may transmit a time gap (t1) between the slot (#0) performing the current transmission and the slot (#27) performing the second transmission and a time gap (t2) between the slot (#0) performing the current transmission and the slot (#30) performing the third transmission to the receiving UE on the SCI. Additionally, for example, the transmitting UE may transmit information on an absolute position of a slot currently performing transmission among the selected three transmission-related slots among 32 slots to the receiving UE on the SCI. For example, the transmitting UE may need 5 bits to transmit an absolute position of a slot currently performing sidelink transmission to the receiving UE based on Equation 2 above.

Figure 16:
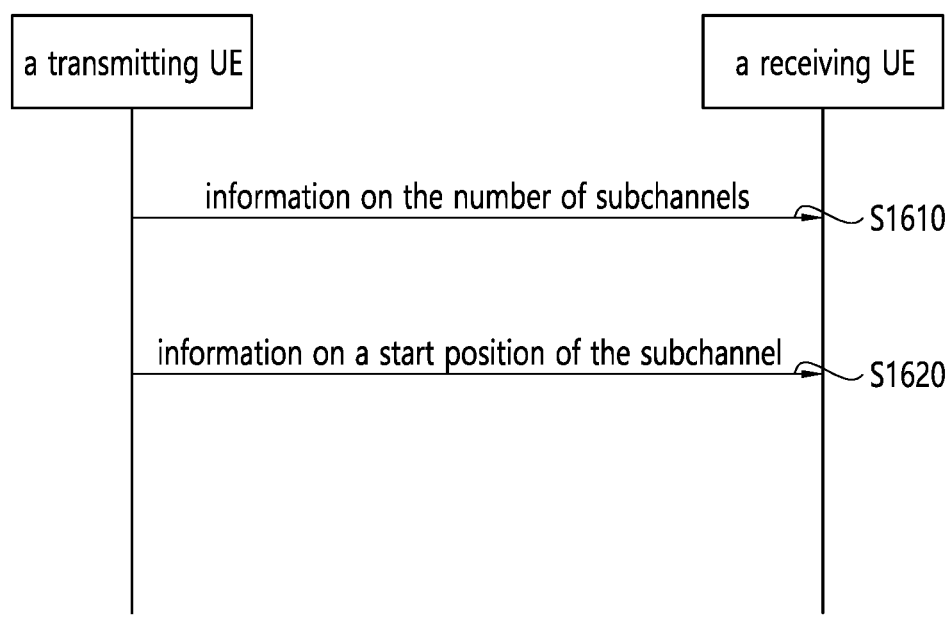
FIG. 16 shows a procedure in which a transmitting UE transmits information on the number and a start position of subchannels according to an embodiment of the present disclosure.

FIG. 16 shows a procedure in which a transmitting UE transmits information on the number and a start position of subchannels according to an embodiment of the present disclosure. The embodiment of FIG. 16 may be combined with various embodiments of the present disclosure.

Referring to FIG. 16, in step S1610, the transmitting UE may transmit information on the number of subchannels to the receiving UE. For example, the transmitting UE may transmit, to the receiving UE, information on the number of subchannels located on a slot related to the current transmission of the transmitting UE and/or information on the number of subchannels located on the remaining N−1 transmission slots excluding the current transmission among the N transmissions of the transmitting UE on a SCI related to the current sidelink transmission. In this case, for example, the number of subchannels located on a slot related to the current transmission of the transmitting UE and the number of subchannels located on a slot related to the remaining N−1 transmissions excluding the current transmission among the N transmissions of the transmitting UE may be the same.

In step S1620, the transmitting UE may transmit information on a start position of the subchannel to the receiving UE. For example, the transmitting UE may transmit, to the receiving UE, information on a start position of a subchannel located on the remaining N−1 transmission-related slots excluding the current transmission among N transmissions of the transmitting UE on the SCI related to the current transmission.

For example, the transmitting UE may perform joint encoding for INFO_LEN and INFO_ST. For example, through signaling in the form of resource indication value (RIV) or combinatorial index, the transmitting UE may simultaneously inform the receiving UE of INFO_LEN and INFO_ST.

Figure 17:
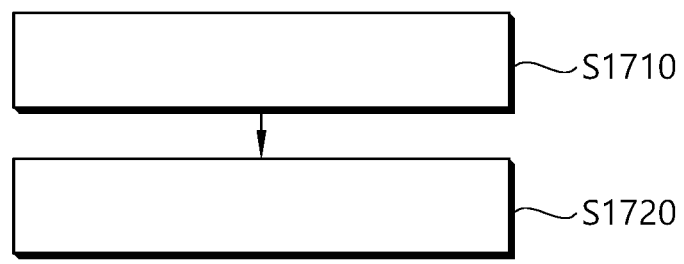
FIG. 17 shows a method for a first device to transmit an SCI including combination information related to a location of a plurality of SL resources to a second device according to an embodiment of the present disclosure.

FIG. 17 shows a method for a first device to transmit an SCI including combination information related to a location of a plurality of SL resources to a second device according to an embodiment of the present disclosure. The embodiment of FIG. 17 may be combined with various embodiments of the present disclosure.

Referring to FIG. 17, in step S1710, the first device 100 may transmit a sidelink control information (SCI) to the second device 200 through a first physical sidelink control channel (PSCCH) or a first physical sidelink shared channel (PSSCH) related to the first PSCCH. For example, the SCI may include combination information related to a location of a plurality of sidelink (SL) resources and information related to a relative position of resources in which the first PSSCH is transmitted among the plurality of SL resources. For example, the combination information related to the location of the plurality of SL resources may include a combinatorial index for selecting N slots from slots related to M SL transmissions. For example, the slots related to the M SL transmissions may represent a maximum time gap between a slot related to an initial transmission and a slot related to a retransmission. For example, the M may be an integer or a positive integer. For example, the maximum time interval may be determined based on a pre-configured slot. For example, the pre-configured slot may be a slot related to an initial transmission. For example, a size of a field related to the combinatorial index in the SCI may be ceiling($\log_2 (_m C_N)$). For example, the information related to the relative position may include information on a relative position related to the N slots based on a current slot. For example, a time interval between the N slots may be determined by a pre-configured function based on the combination information related to the location of the plurality of SL resources and information related to the relative position. For example, a reference size of a field related to time resources on the SCI may be determined based on a pre-configured value of K. For example, a zero padding may be performed on one or more bits that are not used in the field related to the time resources based on the reference size of the field. For example, the SCI may include information representing whether a location of a slot in which each transmission related to the plurality of SL resources is performed is a preceding time or a following time based on a slot related to a pre-configured SL transmission.

For example, the SCI may include information on a number of subchannels related to a first slot and information on a start position of a subchannel related to a second slot. For example, the number of subchannels related to the first slot may be the same as a number of subchannels related to the second slot. For example, the first slot may be a slot in which a SL transmission is currently performed.

For example, the first device 100 may transmit, to the second device 200 on at least one of the plurality of SL resources through a second PSCCH or a second PSSCH related to the second PSCCH, an SCI including the combination information related to the location of the plurality of SL resources and information related to a relative position of resources through which the second PSSCH related to the second PSCCH is transmitted among the plurality of SL resources.

In step S1720, for example, the first device 100 may transmit data to the second device 200 through the first PSSCH related to the first PSCCH. For example, the first device 100 may transmit, to the second device, data through the second PSSCH related to the second PSCCH.

The above-described embodiment may be applied to various devices to be described below. First, for example, the processor 102 of the first device 100 may control the transceiver 106 to transmit a sidelink control information (SCI) to the second device 200 through a first physical sidelink control channel (PSCCH) or a first physical sidelink shared channel (PSSCH) related to the first PSCCH. And, for example, the processor 102 of the first device 100 may control the transceiver 106 to transmit data to the second device 200 through the first PSSCH related to the first PSCCH.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit a sidelink control information (SCI) to a second device through a first physical sidelink control channel (PSCCH) or a first physical sidelink shared channel (PSSCH) related to the first PSCCH, and transmit data to the second device through the first PSSCH related to the first PSCCH. For example, the SCI may include combination information related to a location of a plurality of sidelink (SL) resources and information related to a relative position of resources in which the first PSSCH is transmitted among the plurality of SL resources.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: transmit a sidelink control information (SCI) to a second UE through a first physical sidelink control channel (PSCCH) or a first physical sidelink shared channel (PSSCH) related to the first PSCCH, and transmit data to the second UE through the first PSSCH related to the first PSCCH. For example, the SCI may include combination information related to a location of a plurality of sidelink (SL) resources and information related to a relative position of resources in which the first PSSCH is transmitted among the plurality of SL resources.

According to an embodiment of the present disclosure, a non-transitory computer-readable storage medium storing instructions may be provided. For example, the instructions, when executed, cause a first device to: transmit a sidelink control information (SCI) to a second device through a first physical sidelink control channel (PSCCH) or a first physical sidelink shared channel (PSSCH) related to the first PSCCH, and transmit data to the second device through the first PSSCH related to the first PSCCH. For example, the SCI may include combination information related to a location of a plurality of sidelink (SL) resources and information related to a relative position of resources in which the first PSSCH is transmitted among the plurality of SL resources.

Figure 18:
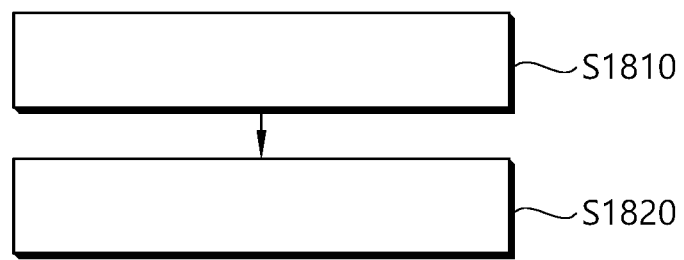
FIG. 18 shows a method for a second device to receive, from a first device, an SCI including combination information related to a location of a plurality of SL resources according to an embodiment of the present disclosure.

FIG. 18 shows a method for a second device to receive, from a first device, an SCI including combination information related to a location of a plurality of SL resources according to an embodiment of the present disclosure. The embodiment of FIG. 18 may be combined with various embodiments of the present disclosure.

Referring to FIG. 18, in step S1810, the second device 200 may receive a sidelink control information (SCI) to the first device 100 through a first physical sidelink control channel (PSCCH) or a first physical sidelink shared channel (PSSCH) related to the first PSCCH. For example, the SCI may include combination information related to a location of a plurality of sidelink (SL) resources and information related to a relative position of resources in which the first PSSCH is transmitted among the plurality of SL resources. For example, the combination information related to the location of the plurality of SL resources may include a combinatorial index for selecting N slots from slots related to M SL transmissions. For example, the slots related to the M SL transmissions may represent a maximum time gap between a slot related to an initial transmission and a slot related to a retransmission. For example, the M may be an integer or a positive integer. For example, the maximum time interval may be determined based on a pre-configured slot. For example, the pre-configured slot may be a slot related to an initial transmission. For example, a size of a field related to the combinatorial index in the SCI may be ceiling(log$_2$ ($_mC_N$)). For example, the information related to the relative position may include information on a relative position related to the N slots based on a current slot. For example, a time interval between the N slots may be determined by a pre-configured function based on the combination information related to the location of the plurality of SL resources and information related to the relative position. For example, a reference size of a field related to time resources on the SCI may be determined based on a pre-configured value of K. For example, a zero padding may be performed on one or more bits that are not used in the field related to the time resources based on the reference size of the field. For example, the SCI may include information representing whether a location of a slot in which each transmission related to the plurality of SL resources is performed is a preceding time or a following time based on a slot related to a pre-configured SL transmission.

For example, the SCI may include information on a number of subchannels related to a first slot and information on a start position of a subchannel related to a second slot. For example, the number of subchannels related to the first slot may be the same as a number of subchannels related to the second slot. For example, the first slot may be a slot in which a SL transmission is currently performed.

For example, the second device 200 may receive, from the first device 100 on at least one of the plurality of SL resources through a second PSCCH or a second PSSCH related to the second PSCCH, an SCI including the combination information related to the location of the plurality of SL resources and information related to a relative position of resources through which the second PSSCH related to the second PSCCH is transmitted among the plurality of SL resources.

In step S1820, for example, the second device 200 may receive data from the first device 100 through the first PSSCH related to the first PSCCH. For example, the second device 200 may receive data from the first device 100 through the second PSSCH related to the second PSCCH.

The above-described embodiment may be applied to various devices to be described below. First, for example, the processor 202 of the second device 200 may control the transceiver 206 to receive a sidelink control information (SCI) to the first device 100 through a first physical sidelink control channel (PSCCH) or a first physical sidelink shared channel (PSSCH) related to the first PSCCH. And, for example, the processor 202 of the second device 200 may control the transceiver 206 to receive data from the first device 100 through the first PSSCH related to the first PSCCH.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive a sidelink control information (SCI) from a first device through a first physical sidelink control channel (PSCCH) or a first physical sidelink shared channel (PSSCH) related to the first PSCCH and receive data from the first device through the first PSSCH related to the first PSCCH. For example, the SCI may include combination information related to a location of a plurality of sidelink (SL) resources and information related to a relative position of resources in which the first PSSCH is transmitted among the plurality of SL resources.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
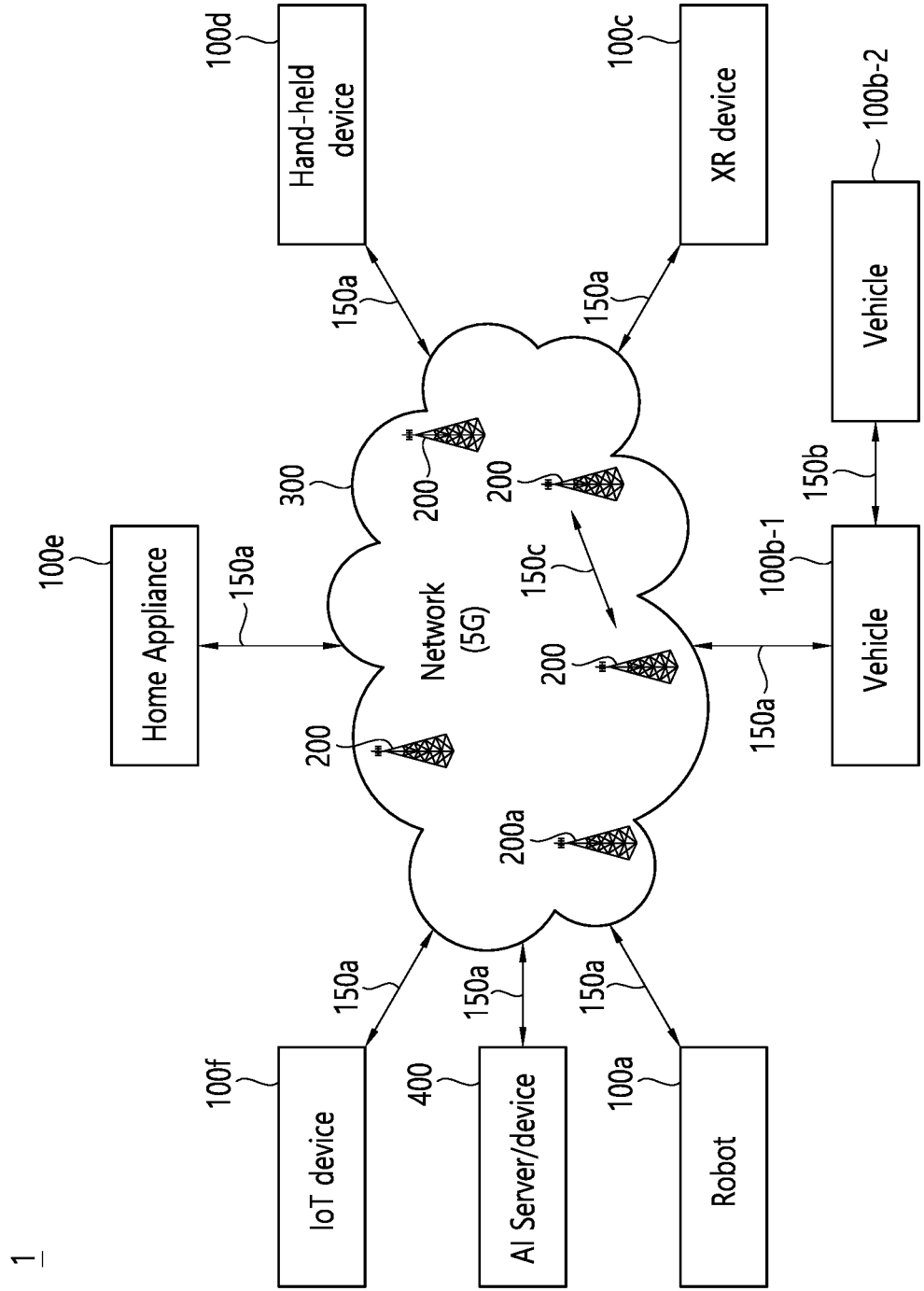
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Herein, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology, and may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). LTE-M technology may be implemented in at least one of 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the above-mentioned name. Additionally or alternatively, the wireless communication technology implemented in the wireless device of this specification may include at least one of ZigBee, Bluetooth, and Low Power Wide Area Network (LPWAN) and is not limited to the above-mentioned name. For example, the ZigBee technology may create personal area networks (PAN) related to small/low-power digital communication based on various standards such as IEEE 802.15.4, and can be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
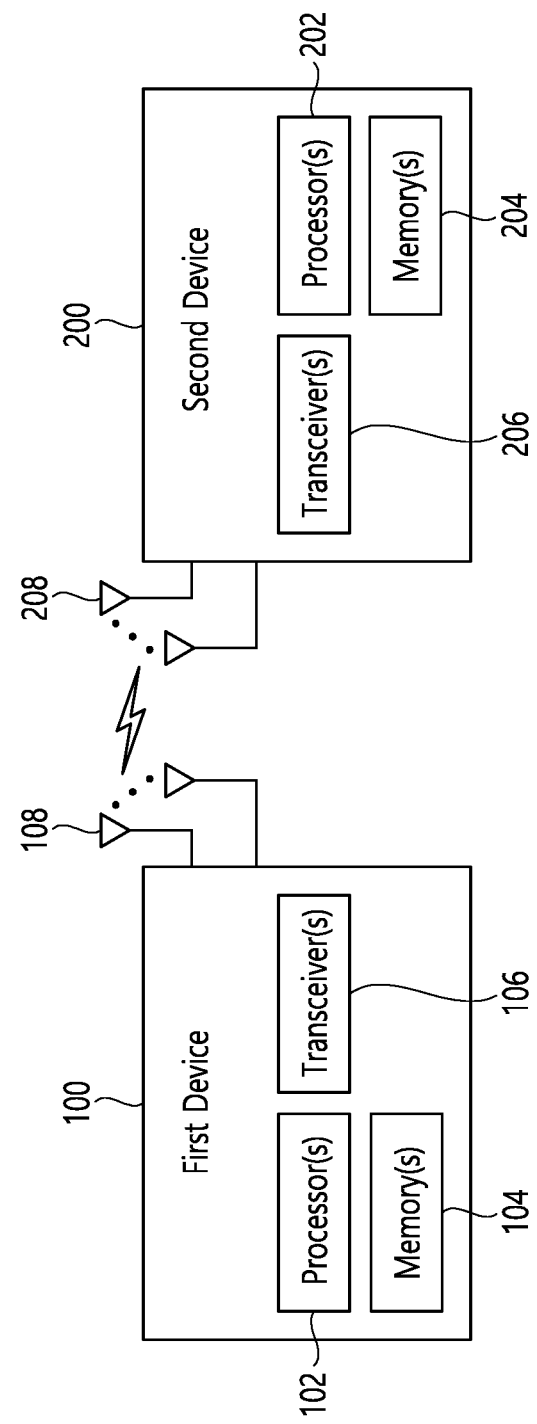
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
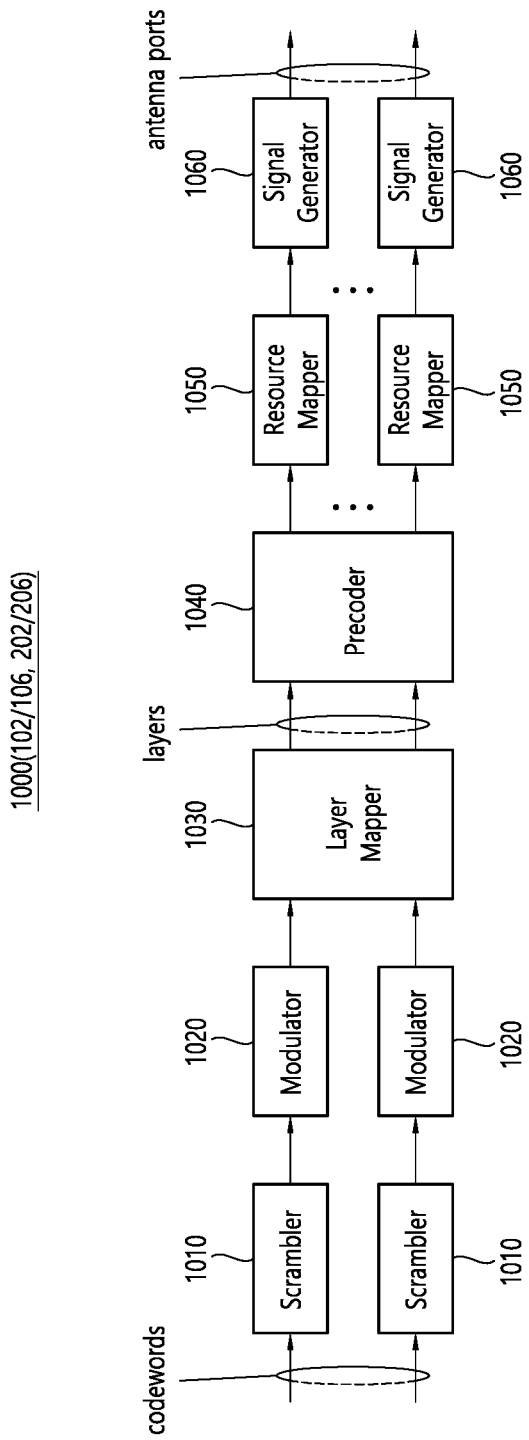
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20.

Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
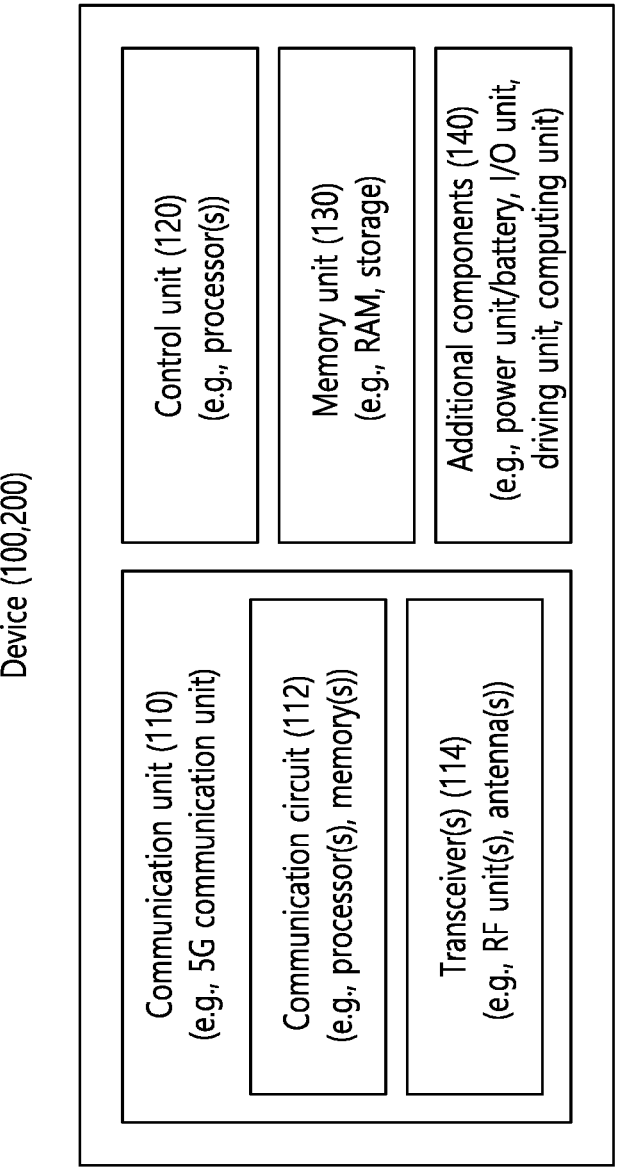
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
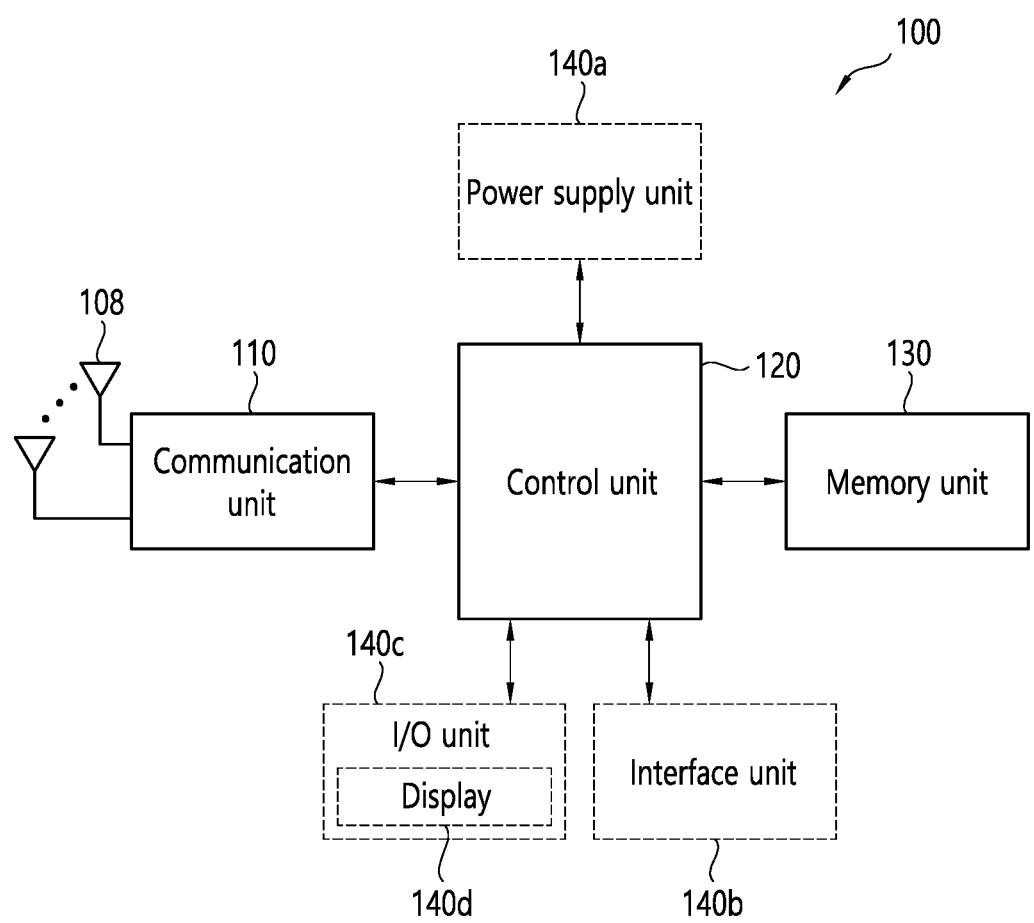
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
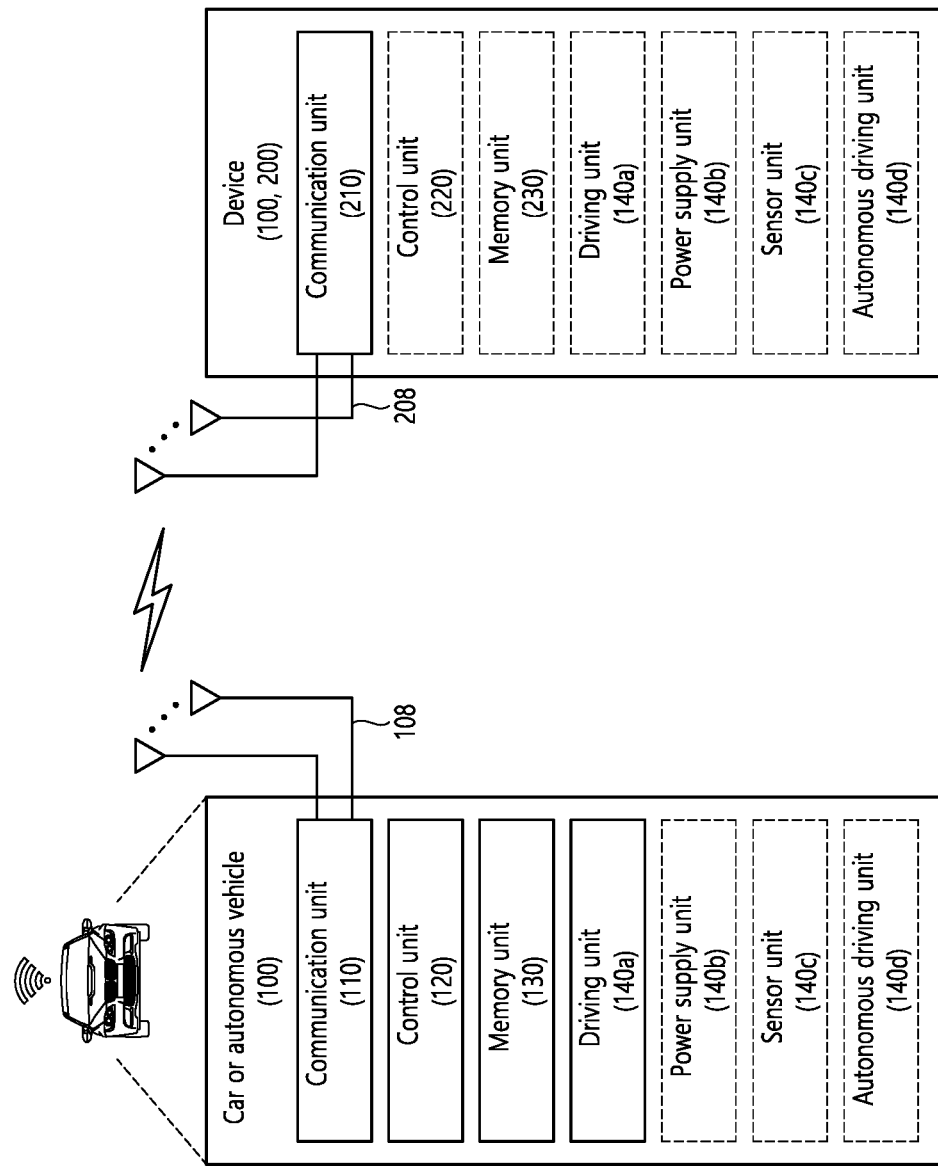
FIG. 24 shows a car or an autonomous vehicle, in accordance with an embodiment of the present disclosure.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   transmitting, to a second device, control information for scheduling a physical shared channel through a physical sidelink-control channel based on a transmission resource; and
   transmitting, to the second device, data through the physical shared channel based on the transmission resource,
   wherein the control information includes combination information related to a location of a plurality of transmission resources within a plurality of slots that can be signaled by the control information, and
   wherein a reference timing of the plurality of slots that can be signaled by the control information is a transmission slot located after the transmission resource in which the control information is transmitted.

2. The method of claim 1, wherein the combination information includes a combinatorial index for selecting N slots from slots related to M transmissions,
   wherein the M and the N are integers.

3. The method of claim 2, wherein the M is a maximum number of slots that can be represented by the control information, and
   wherein the N is a number of the transmission resources within the plurality of slots that can be signaled by the control information.

4. The method of claim 1, wherein the reference timing is a pre-configured slot.

5. The method of claim 4, wherein the pre-configured slot is a slot related to an initial transmission.

6. The method of claim 2, wherein a size of a field related to the combinatorial index in the control information is ceiling ($\log_2(_MC_N)$),
   wherein the $_MC_N$ is a mathematical symbol meaning a combination of selecting the N from the M candidates.

7. The method of claim 1, wherein the control information includes information related to the reference timing.

8. The method of claim 2, wherein a time interval between the N slots is determined by a pre-configured function based on the combination information related to the location of the plurality of transmission resources and information related to the reference timing.

9. The method of claim 1, wherein a reference size of a field related to time resources on the control information is determined based on a pre-configured value of K,
   wherein the K is a maximum number that can be indicated the transmission resources within the plurality of slots that can be signaled by the control information,
   wherein the K is an integer.

10. The method of claim 9, wherein a zero padding is performed on one or more bits that are not used in the field related to the time resources based on the reference size of the field.

11. A first device for performing wireless communication, the first device comprising:
    at least one transceiver;
    at least one processor; and
    at least one memory connected to the at least one processor and storing instructions that, based on being executed, cause the first device to perform operations comprising:
    transmitting, to a second device, control information for scheduling a physical shared channel through a physical control channel based on a transmission resource; and
    transmitting, to the second device, data through the physical shared channel based on the transmission resource,
    wherein the control information includes combination information related to a location of a plurality of transmission resources within a plurality of slots that can be signaled by the control information, and
    wherein a reference timing of the plurality of slots that can be signaled by the control information is a transmission slot located after the transmission resource in which the control information is transmitted.

12. The first device of claim 11, wherein the combination information includes a combinatorial index for selecting N slots from slots related to M transmissions,
wherein the M and the N are integers.

13. The first device of claim 12, wherein the M is a maximum number of slots that can be represented by the control information, and
wherein the N is a number of the transmission resources within the plurality of slots that can be signaled by the control information.

14. The first device of claim 12, wherein a size of a field related to the combinatorial index in the control information is ceiling ($\log_2(_MC_N)$),
wherein the $_MC_N$ is a mathematical symbol meaning a combination of selecting the N from the M candidates.

15. The first device of claim 11, wherein the control information includes information related to the reference timing.

16. A device configured to control a first user equipment (UE), the device comprising:
at least one processor; and
at least one memory connected to the at least one processor and storing instructions that, based on being executed, cause the first UE to perform operations comprising:
transmitting, to a second UE, control information for scheduling a physical shared channel through a physical control channel based on a transmission resource; and
transmitting, to the second UE, data through the physical shared channel based on the transmission resource,
wherein the control information includes combination information related to a location of a plurality of transmission resources within a plurality of slots that can be signaled by the control information, and
wherein a reference timing of the plurality of slots that can be signaled by the control information is a transmission slot located after the transmission resource in which the control information is transmitted.

17. The device of claim 16, wherein the combination information includes a combinatorial index for selecting N slots from slots related to M transmissions,
wherein the M and the N are integers.

18. The device of claim 17, wherein the M is a maximum number of slots that can be represented by the control information, and
wherein the N is a number of the transmission resources within the plurality of slots that can be signaled by the control information.

19. The device of claim 17, wherein a size of a field related to the combinatorial index in the control information is ceiling ($\log_2(_MC_N)$),
wherein the $_MC_N$ is a mathematical symbol meaning a combination of selecting the N from the M candidates.

20. The device of claim 16, wherein the control information includes information related to the reference timing.

* * * * *